US008511052B2

(12) United States Patent  
Dow et al.

(10) Patent No.: US 8,511,052 B2
(45) Date of Patent: Aug. 20, 2013

(54) WINDROW MERGER

(75) Inventors: Steven S. Dow, Byron, NY (US); Paul W. Dow, Byron, NY (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 12/928,978

(22) Filed: Dec. 22, 2010

(65) Prior Publication Data

US 2011/0094202 A1 Apr. 28, 2011

Related U.S. Application Data

(62) Division of application No. 12/321,374, filed on Jan. 19, 2009, now Pat. No. 8,091,331.

(60) Provisional application No. 61/189,071, filed on Aug. 15, 2008, provisional application No. 61/189,072, filed on Aug. 15, 2008.

(51) Int. Cl.
*A01D 43/02* (2006.01)
*A01D 57/00* (2006.01)

(52) U.S. Cl.
USPC .............................................. 56/364; 56/192

(58) Field of Classification Search
USPC ..................... 56/228, 364, 192; 172/311
See application file for complete search history.

(56) References Cited

U.S. PATENT DOCUMENTS

| | | | |
|---|---|---|---|
| 1,847,399 A * | 3/1932 | Innes | 56/364 |
| 1,877,519 A * | 9/1932 | MacGregor | 56/364 |
| 1,877,770 A | 9/1932 | Larson | |
| 2,168,266 A | 8/1939 | McElwain | |
| 2,195,381 A | 3/1940 | Patterson | |
| 2,343,583 A | 3/1944 | Rogers | |
| 3,214,002 A | 10/1965 | Kirkpatrick et al. | |
| 3,240,005 A * | 3/1966 | Rowse | 56/386 |
| 3,515,408 A | 6/1970 | Cagle | |
| 3,650,096 A | 3/1972 | Caldwell | |
| 3,695,015 A | 10/1972 | Twidale et al. | |

(Continued)

FOREIGN PATENT DOCUMENTS

| | | |
|---|---|---|
| DE | 90 14 438.4 | 3/1991 |
| DE | 4341610 | 6/1995 |

(Continued)

OTHER PUBLICATIONS

"Snel schud-/harksysteem", 1 page (Jul. 21, 2000); with English translation, 2 pages.

*Primary Examiner* — Alicia Torres
(74) *Attorney, Agent, or Firm* — Merchant & Gould P.C.

(57) ABSTRACT

A windrow merger including three pickup and transfer units, a folding system, and a plurality of float mechanisms. The folding system employs simultaneous rearward, outward, and upward folding motion so as to ensure none of the units interfere with the other units while folding, and likewise while unfolding. The folding system can further fold and unfold each of the three pickup and transfer units at the same time. During merging operations, the plurality of float mechanisms of the windrow merger limits the range of motion of each pickup and transfer unit. The float mechanisms further transfer a portion of the weight of each pickup and transfer unit from the ground to the frame of the merger. The units of the windrow merger can also include a rub rail having a surface that reduces swirling or clumping of material as the material is conveyed toward an end of the windrow merger.

11 Claims, 25 Drawing Sheets

(56) References Cited

U.S. PATENT DOCUMENTS

| | | | | |
|---|---|---|---|---|
| 3,709,360 A | | 1/1973 | Baker | |
| 3,714,766 A | | 2/1973 | Ender et al. | |
| 3,897,832 A | | 8/1975 | Leedahl et al. | |
| 4,042,044 A | * | 8/1977 | Honnold | 172/311 |
| 4,058,170 A | * | 11/1977 | Ankenman et al. | 172/311 |
| 4,184,314 A | | 1/1980 | Hobbs | |
| 4,232,747 A | | 11/1980 | Pfenninger et al. | |
| 4,346,909 A | | 8/1982 | Hundeby | |
| 4,409,780 A | | 10/1983 | Beougher et al. | |
| 4,487,004 A | | 12/1984 | Kejr | |
| 4,621,487 A | * | 11/1986 | Urlacher et al. | 56/228 |
| 4,658,572 A | | 4/1987 | Honey et al. | |
| 4,738,092 A | | 4/1988 | Jennings | |
| 4,768,334 A | | 9/1988 | Honey et al. | |
| 4,793,129 A | | 12/1988 | Ehrhart et al. | |
| 4,840,020 A | | 6/1989 | Oka | |
| 4,896,732 A | * | 1/1990 | Stark | 172/311 |
| 4,910,951 A | | 3/1990 | Reilly et al. | |
| 4,981,013 A | * | 1/1991 | Underwood | 56/364 |
| 5,031,394 A | * | 7/1991 | Honey | 56/228 |
| 5,111,636 A | | 5/1992 | Quirin | |
| 5,155,986 A | | 10/1992 | Kelderman | |
| 5,177,944 A | | 1/1993 | Finlay | |
| 5,203,154 A | | 4/1993 | Lesher et al. | |
| 5,507,139 A | | 4/1996 | Delperdang et al. | |
| 5,893,262 A | | 4/1999 | Harbach | |
| 5,911,625 A | | 6/1999 | von Allworden | |
| 5,956,934 A | | 9/1999 | Wright et al. | |
| 5,964,077 A | | 10/1999 | Guinn | |
| 6,205,757 B1 | | 3/2001 | Dow et al. | |
| 6,212,865 B1 | | 4/2001 | Peeters et al. | |
| 6,401,440 B1 | | 6/2002 | Franet et al. | |
| 6,658,828 B2 | | 12/2003 | Franet | |
| 6,758,031 B2 | | 7/2004 | Franet et al. | |
| 6,862,873 B2 | | 3/2005 | Franet | |
| 7,310,929 B2 | | 12/2007 | Dow et al. | |
| 7,650,736 B1 | | 1/2010 | Salley et al. | |
| 7,827,774 B2 | | 11/2010 | Dow et al. | |
| 8,091,331 B2 | | 1/2012 | Dow et al. | |
| 2005/0126153 A1 | | 6/2005 | Hironimus et al. | |
| 2005/0172598 A1 | | 8/2005 | Billard | |
| 2006/0248870 A1 | | 11/2006 | Geiser | |
| 2006/0254244 A1 | | 11/2006 | Geiser | |
| 2009/0241503 A1 | | 10/2009 | Babler et al. | |
| 2009/0320434 A1 | * | 12/2009 | Pourchet et al. | 56/364 |

FOREIGN PATENT DOCUMENTS

| | | |
|---|---|---|
| DE | 43 41 610 | 8/1995 |
| EP | 0 853 872 | 3/2003 |
| EP | 0 853 872 B1 | 3/2003 |
| FR | 2 663 189 A1 | 12/1991 |
| GB | 2 194 422 A | 3/1998 |
| SU | 835359 | 6/1981 |
| WO | WO 87/06793 | 11/1987 |

* cited by examiner

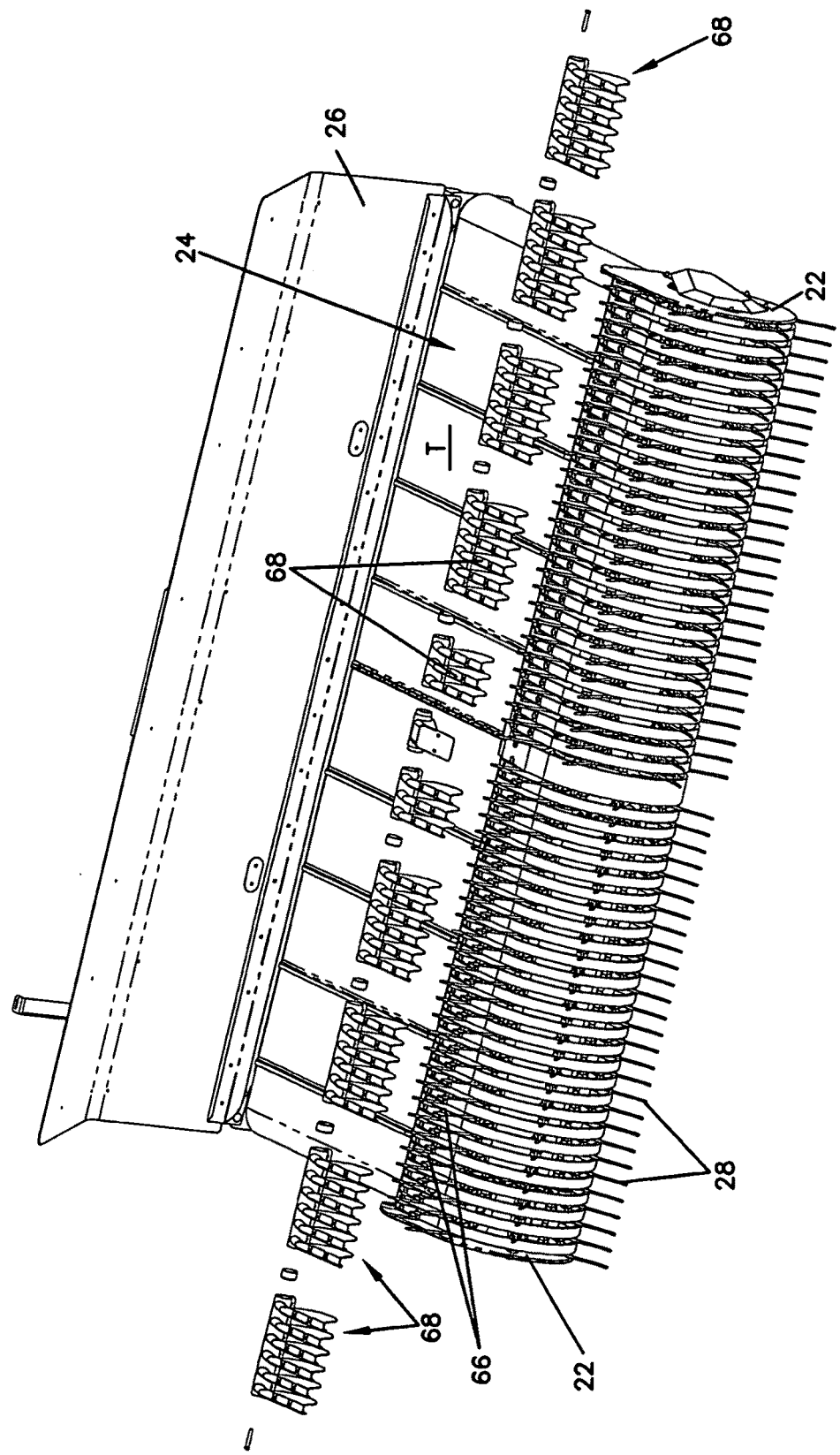

WINDROW MERGER

CROSS-REFERENCE TO RELATED APPLICATIONS

This application is a divisional of U.S. application Ser. No. 12/321,374, filed Jan. 19, 2009; which claims the benefit of U.S. Provisional Application Ser. No. 61/189,071 filed Aug. 15, 2008, and U.S. Provisional Application Ser. No. 61/189,072 filed Aug. 15, 2008; which applications are incorporated herein by reference.

FIELD OF THE TECHNOLOGY

The present invention relates to a windrow merger arrangement and associated systems and methods. In particular, the present invention relates to a windrow merger arrangement having more than two pickup and conveyor assemblies, systems for operating and using the windrow merger arrangement, and associated methods.

BACKGROUND

Windrow mergers are used to gather and merge material, such as cut hay, into a single windrow for harvesting or baling. Conventional windrow mergers typically include a single pickup head that generally functions in a satisfactory manner when used on a relatively small scale. However, for large scale operations requiring greater merging rates, the capacity and effectiveness of single-head mergers is limited.

To achieve greater merging rates, mergers having more than one pickup head assembly have been developed. Some such mergers include folding assemblies that allow one or more of the pickup head assemblies to fold for transport. Folding the assemblies of a merger presents unique design challenges including the relative positioning of the folding assemblies, the relative movement of the folding assemblies, and the overall provision of structural support for the folding assemblies.

Additionally, in windrow merging operations it is preferable to produce a smooth, even windrow so that the harvesting device (forage harvester or baler) that follows can operate at maximum efficiency. Some conventional mergers have merger heads with projecting structure in the region where the gathered material is conveyed. The projecting structure can cause the gathered material to swirl and clump as it passes by the structure during conveyance toward the end of the merger.

In general, conventional arrangements of window mergers can be improved.

SUMMARY

The present disclosure relates to a merger arrangement having three pickup and transfer units. In one aspect, the merger includes a folding system that employs simultaneous rearward, outward and upward folding movement so as to ensure none of the units interfere with the other units while folding, and likewise while unfolding. In another aspect, the folding system is capable of folding and unfolding each of the three units at the same time. In still another aspect, the merger includes a plurality of float mechanisms that limits the range of motion of each unit. In yet another aspect, the float mechanisms transfer a portion of the weight of each unit from the ground to the frame of the merger. In still another aspect, the pickup and transfer unit of the merger includes a rub rail that aids in creating a smooth, uniform windrow.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 23 is an exploded top perspective view of the portion of the merger of FIG. 22, illustrating one embodiment of comb segments, in accordance with the principles disclosed;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
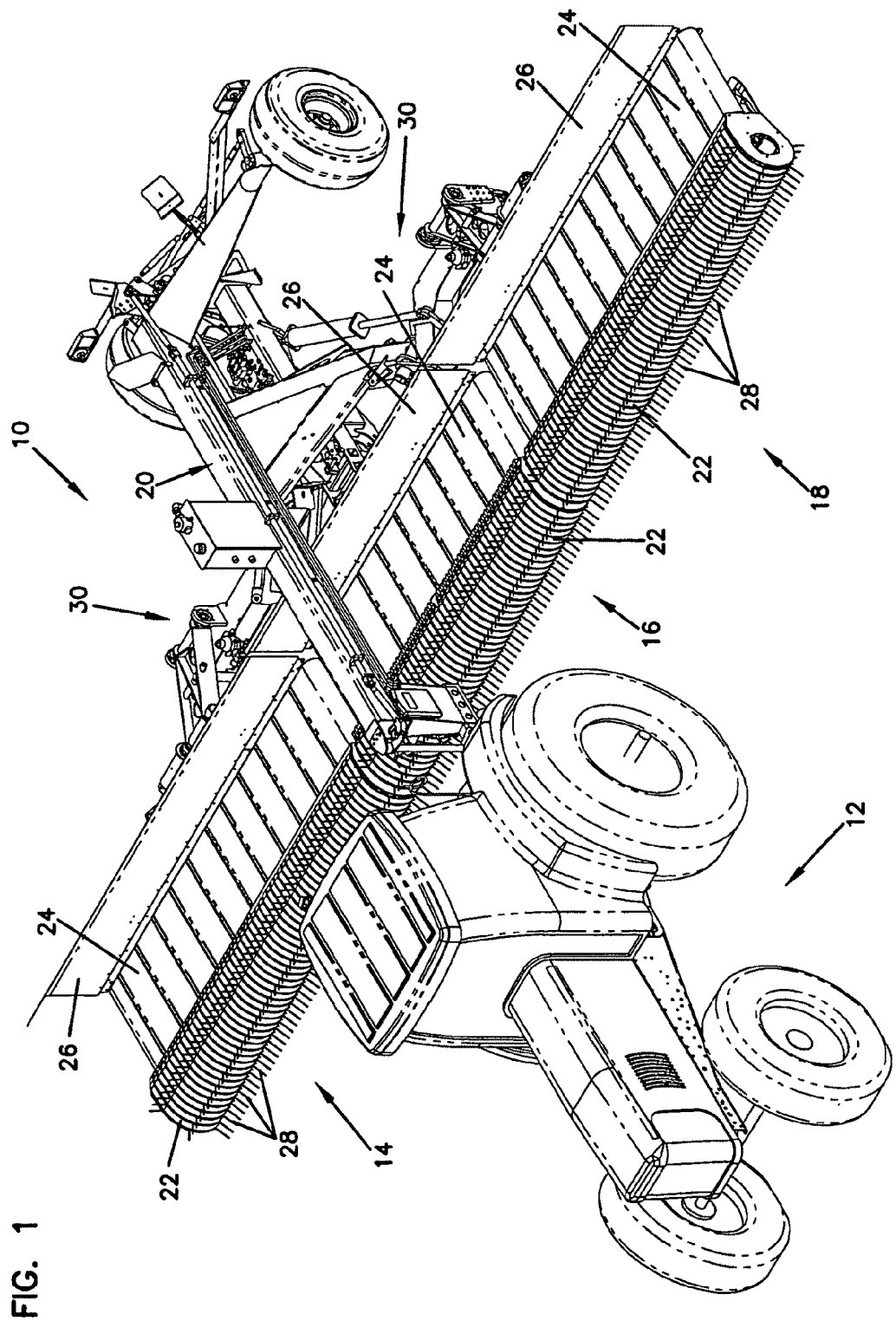
FIG. 1 is a front perspective view of a vehicle towing an embodiment of a merger, in accordance with the principles disclosed.

FIG. 1 illustrates a merger 10 in accordance with the principles disclosed. The merger 10 is typically towed behind a towing device 12, such as a tractor; however, the principles of the present merger may used in a configuration that is self-propelled as well. The merger 10 generally includes three independent pickup and transfer units, including a first outer unit 14, a second outer unit 18, and a center unit 16 located between the first and second outer units 14, 18. The units 14, 16, 18 are supported on a frame 20 (see also FIG. 2). Each unit generally includes a merger head 22 and a conveyor 24. The merger head 22 and conveyor 24 of each unit operates independently of the other units.

In general, the merger head 22 of each unit 14, 16, 18 includes a multiplicity of tines 28 spaced along the length of the head, and spaced radially around the circumference of the head. Each unit includes a separate head motor (not shown) that drives the merger head. The motors are recessed within the ends of the merger heads 22 so that the heads can be run in as close proximity of each other as possible and so the motors do not accumulate material.

The conveyor 24 of each pickup and transfer unit 14, 16, 18 generally includes a belt mounted about rollers and/or pulleys (not shown). In addition to the separate head motors, each unit also includes a separate conveyor motor(s) (not shown) that drives the belt. The conveyor motors are reversible so the conveyors 24 may be operated to direct material to the left side of the merger 10 or the right side of the merger.

Further, in the illustrated embodiment, each unit 14, 16, 18 includes a shroud 26 located generally behind the conveyor 24. The shroud 26 extends upward and forward in an arcing configuration over the conveyors 24. The arching shrouds 26 direct material thrown rearward by the merger heads 22 down onto the conveyors 24.

Further details of example units having merger heads and conveyors that can be used in the present merger are described in U.S. Pat. No. 7,310,929; which patent is incorporated herein by reference.

The present merger 10 further includes a folding system 30 that folds and unfolds each pickup and transfer unit 14, 16, 18. The folding system 30 can be used to position one or more of the pickup and transfer units 14, 16, 18 in a folded position, an unfolded position, or a partially folded position during merging operations.

Figure 2:
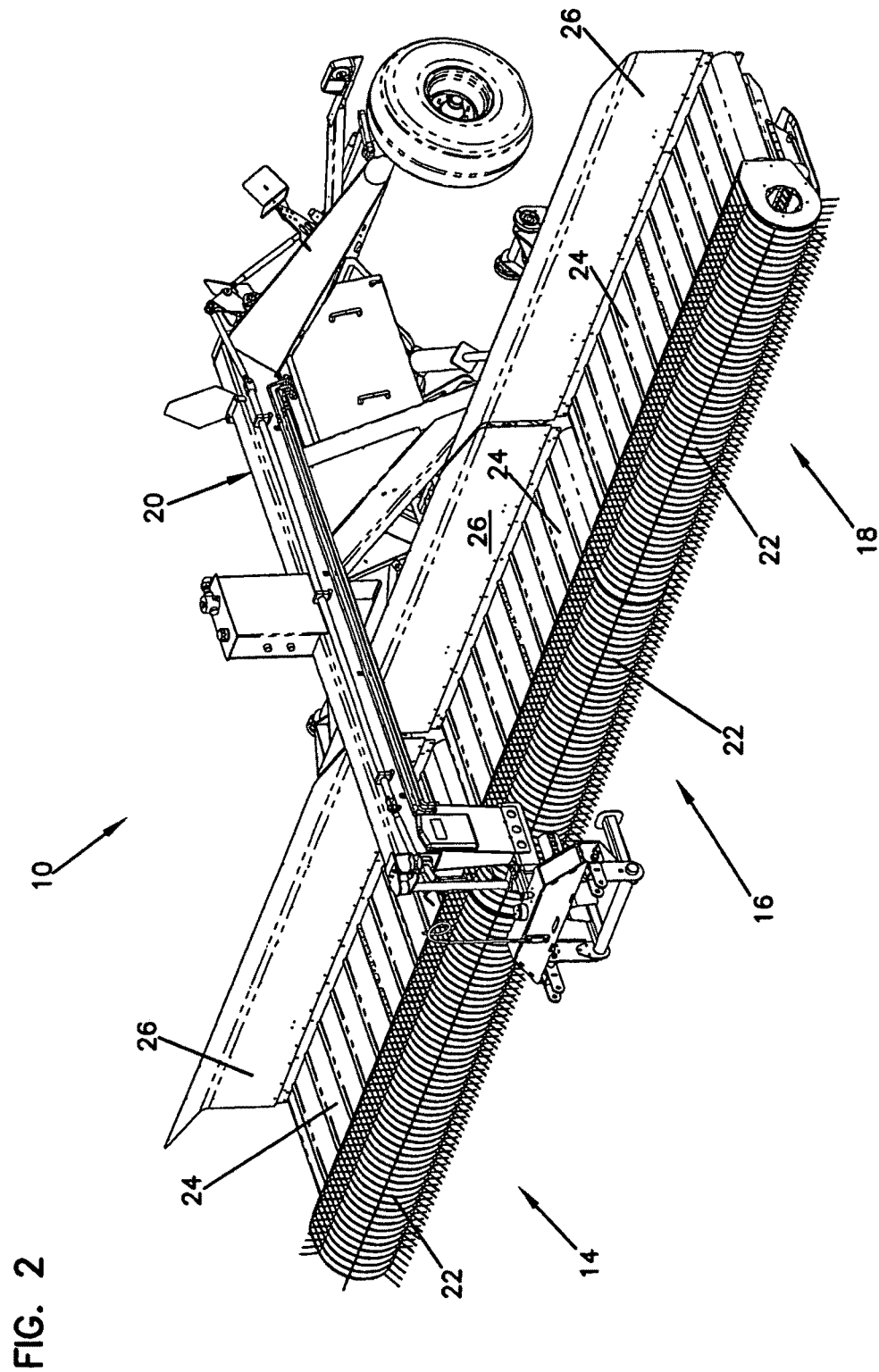
FIG. 2 is a front perspective view of the merger of FIG. 1, shown in isolation.
Figure 3:
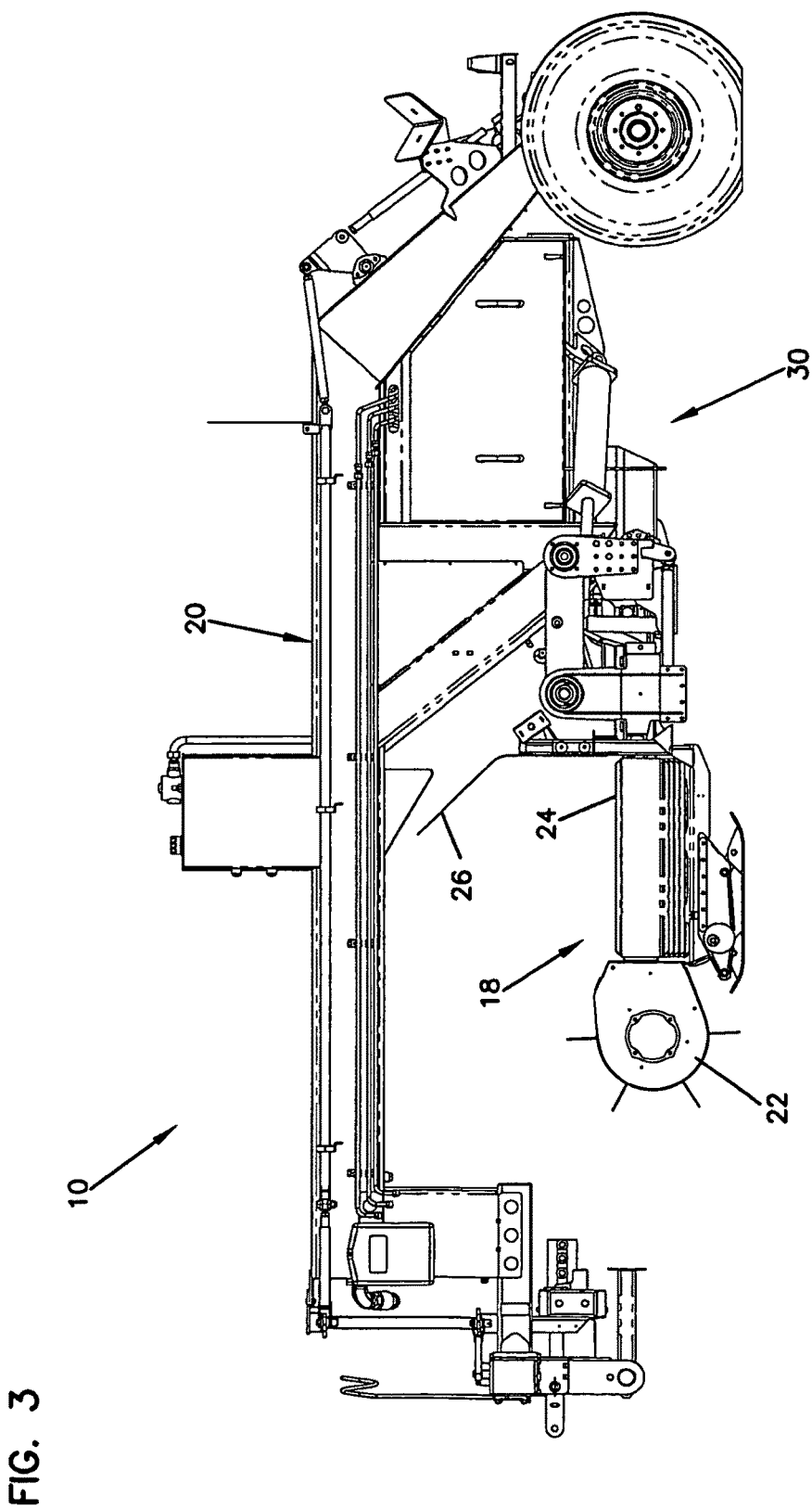
FIG. 3 is a side elevation view of the merger of FIG. 2.
Figure 4:
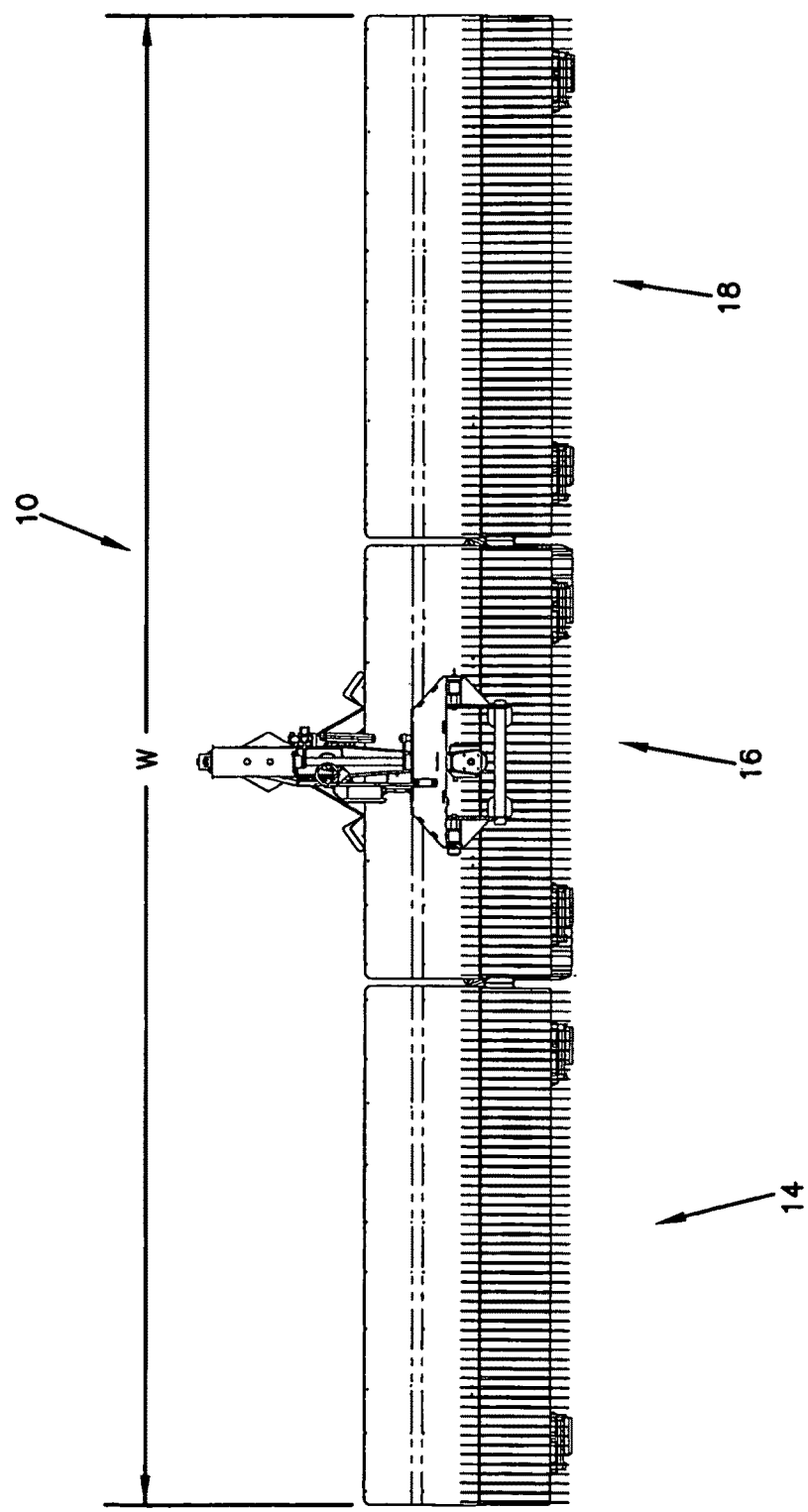
FIG. 4 is a front elevation view of the merger of FIG. 2.

Referring now to FIGS. 2 and 3, during merging operations, each of the units 14, 16, 18 can be unfolded such that the units define a continuous, uninterrupted front merging face. What is meant by continuous and uninterrupted is that the units are arranged side-by-side (FIG. 2) to pick up substantially all the material lying on the terrain between the outer ends of the outermost units (e.g., 14, 18), and are further arranged in alignment (FIG. 3) to transfer crop or material from the conveyor 24 of one unit to another. In one embodiment, the front merging face has a width W (FIG. 4) of about 30 feet when all three units are being utilized for merging operations; in other embodiments, the width of the front merging face is between about 30 feet and about 36 feet.

The present folding system 30 provides a user operational flexibility with respect to the positioning of each unit so that multiple configurations for different merging needs and operations are possible. For example, the folding system 30 may be used to position all three pickup and transfer units 14, 16, 18 of the merger 10 in the unfolded, merging position shown in FIG. 1. In another example, the folding system 30 may be used to position only the leftward outer unit 14 (or only the rightward outer unit 18) and the center unit 16 in an unfolded, merging position. Because the pickup and transfer units 14, 16, 18 are independently operable, the merger 10 is able to operate with only two of the units in an unfolded position. Such a two-unit merging configuration may be needed to accommodate irregularities in the terrain, to access smaller fields or irregular shaped fields, or for improved merging at edges of fields.

Likewise, the folding system 30 of the present merger 10 may be used to position only the center unit 16 in an unfolded merging position. Such a one-unit merging configuration may be needed to access or operate in even smaller areas. And further in other applications, the folding system 30 may be used to position only the leftward and rightward outer units in unfolded merging positions, for example, when the operator needs to pass over and/or straddle difficult terrain.

As previously described, the present merger 10 additionally has operational flexibility with respect to the direction of conveying material. Because the conveyors 24 of each unit 14, 16, 18 are reversible or operable in both directions, material may be selectively transferred either to the left or to the right. Selective control over the conveyor 24 travel direction, as well as the selective operation and folding of each head 22, provides multiple merging configurations that can be utilized and that are adaptable to address a variety of merging needs.

Also, because the units 14, 16, 18, including the merger heads 22 and conveyors 24, are independently operable, the merger 10 may be operated continuously, even while one or more pickup and transfer units 14, 16, 18 are being folded or unfolded. For example, operation of the leftward outer unit 14 and the center unit 16 can be maintained during folding movement of the rightward outer unit 18. This increases merging efficiencies by eliminating the need for the operator to stop operation of the units prior to folding one or more units. The operator can instead continue merging with the one for more unfolded units while folding the other unit(s).

In addition, the folding system 30 can be operated to fold one or more of the units while the folding unit(s) is operating. This similarly increases merging efficiencies by eliminating the need for the operator to stop operation of the units prior to folding the one or more units. The operator can instead continue merging with the one or more unfolded units while folding the other unit(s), and then further unfold the folded unit(s) and resume merging with all units without having to restart operation of any unit. In short, the operation of each unit, as well as the folding and unfolding of each unit can all be accomplished during and independently of the operation and folding movement of the other units.

Figure 10:
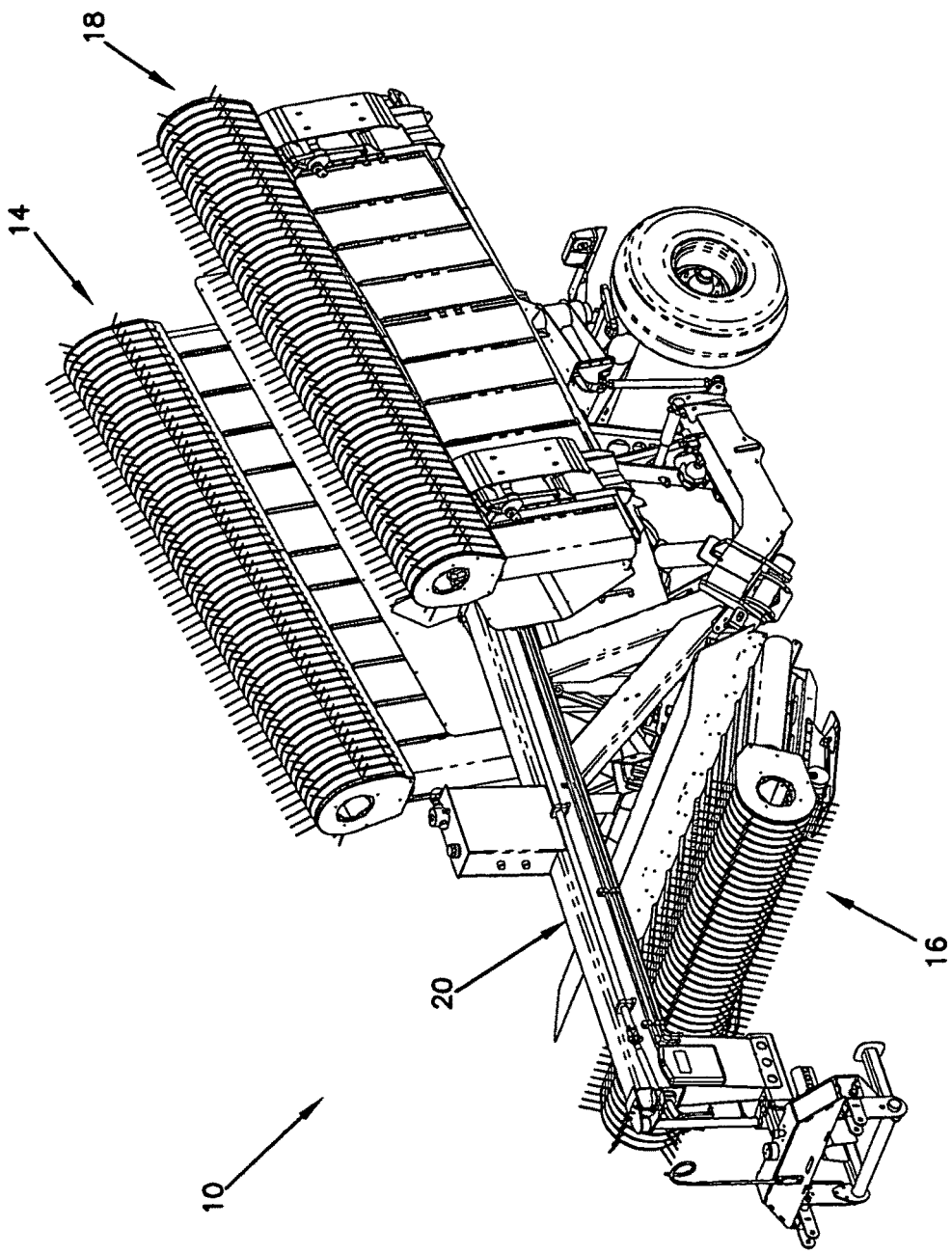
FIG. 10 is a front perspective view of the merger of FIG. 9.

In addition to use during merging operations, the folding system 30 can also be used to fold and unfold the merger 10 between an operating configuration (at which one or more pickup and transfer units are unfolded) and a transport or stowed configuration (at which all pickup and transfer units are folded (FIG. 10)). In the folded transport configuration, the merger 10 is sized for transport on public roads. The folding system 30 is described below with respect to folding for transport; however the description below applies to folding during merging operations as well.

Figure 5:
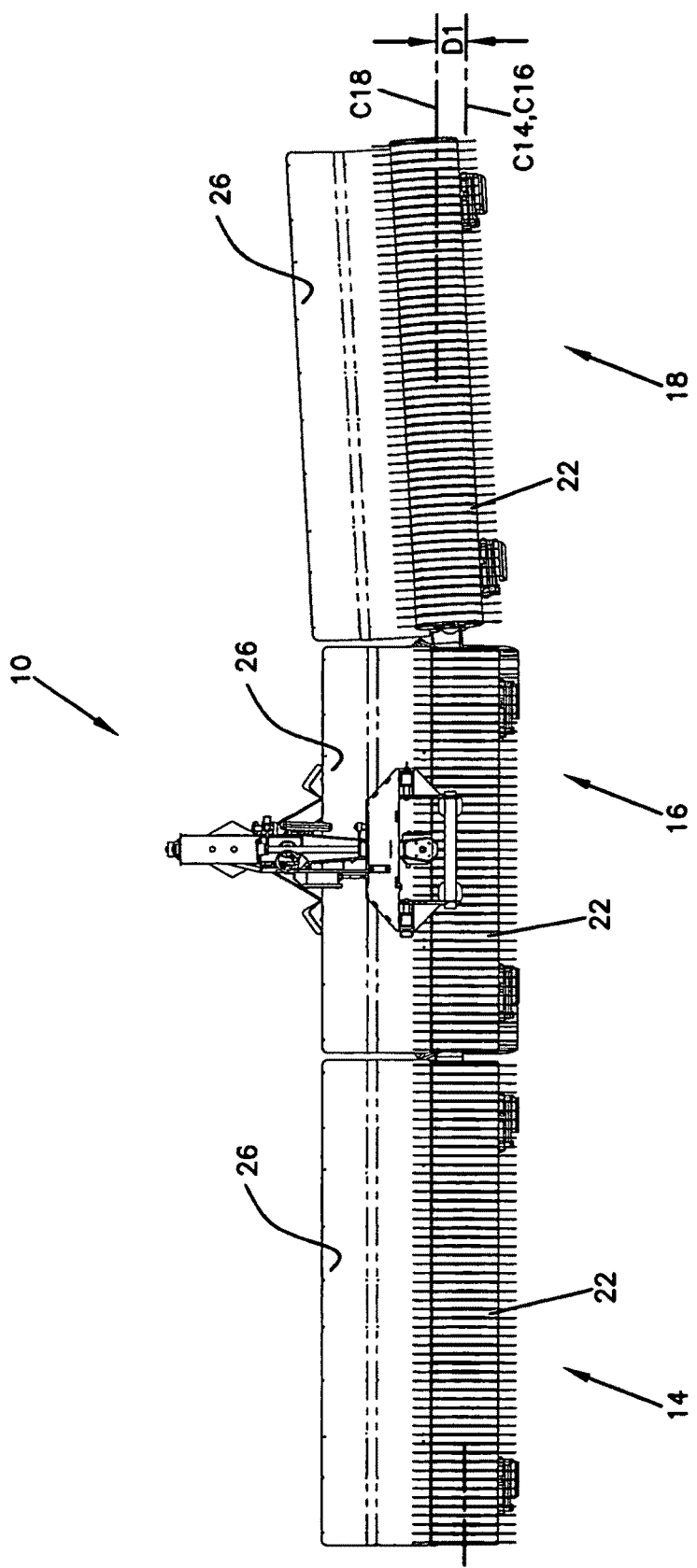
FIG. 5 is a front elevation view of the merger of FIG. 4, illustrated in an intermediate folding position.
Figure 6:
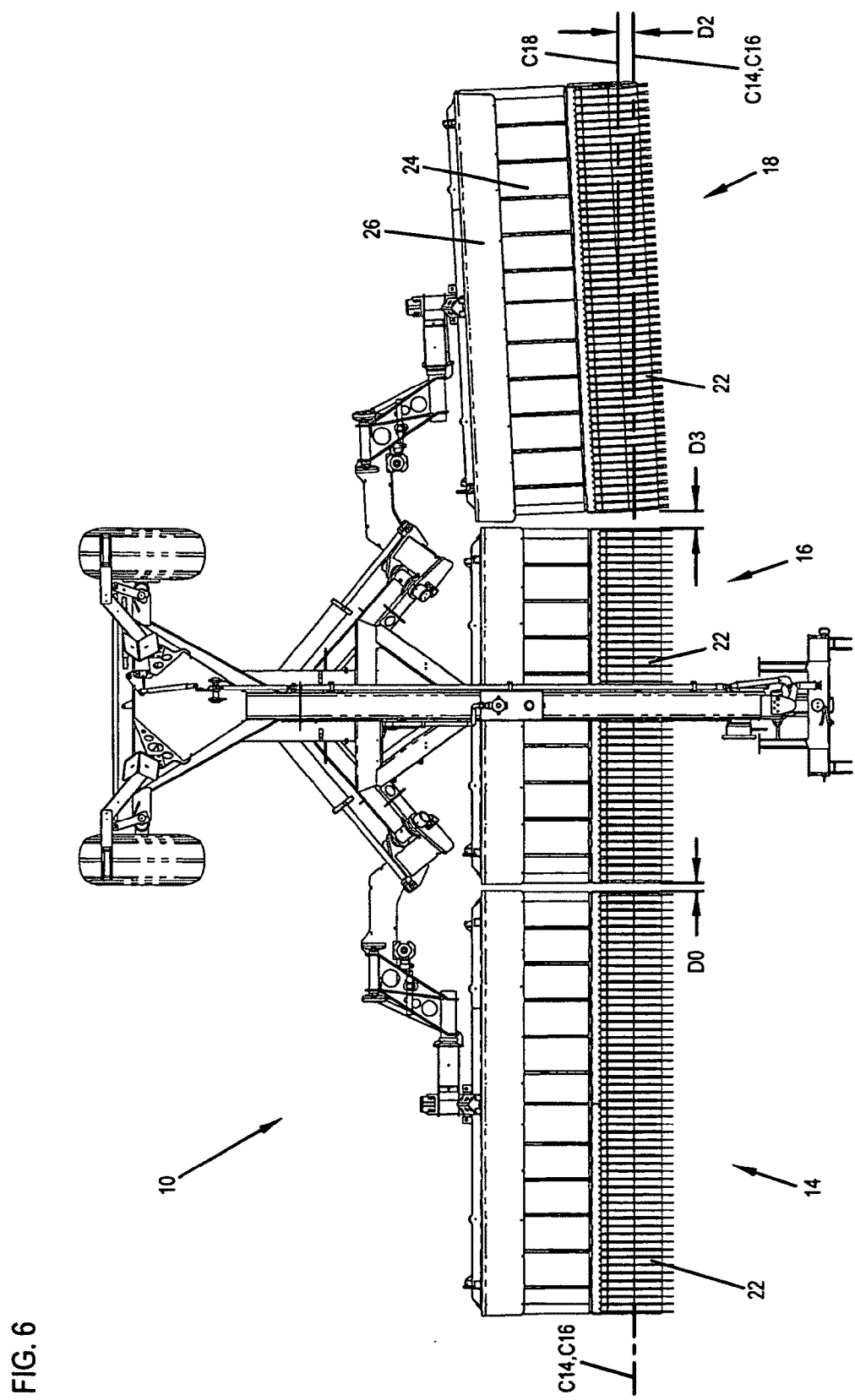
FIG. 6 is a top plan view of the merger of FIG. 5.

Referring now to FIGS. 5 and 6, the rightward outer pickup and transfer unit 18 is illustrated in an initial stage of folding. For purposes of explanation only, the folding movement of the rightward unit 18 is described with respect to the relative position of a center point of the merger head 22 of the unit 18 (e.g., center point position C18 relative to an unfolded position as illustrated by center point positions C14, C16 of units 14, 16). Also, while only the folding of the rightward outer unit 18 is described and illustrated, it is to be understood that the leftward outer unit 14 folds in a similar manner.

Figure 7:
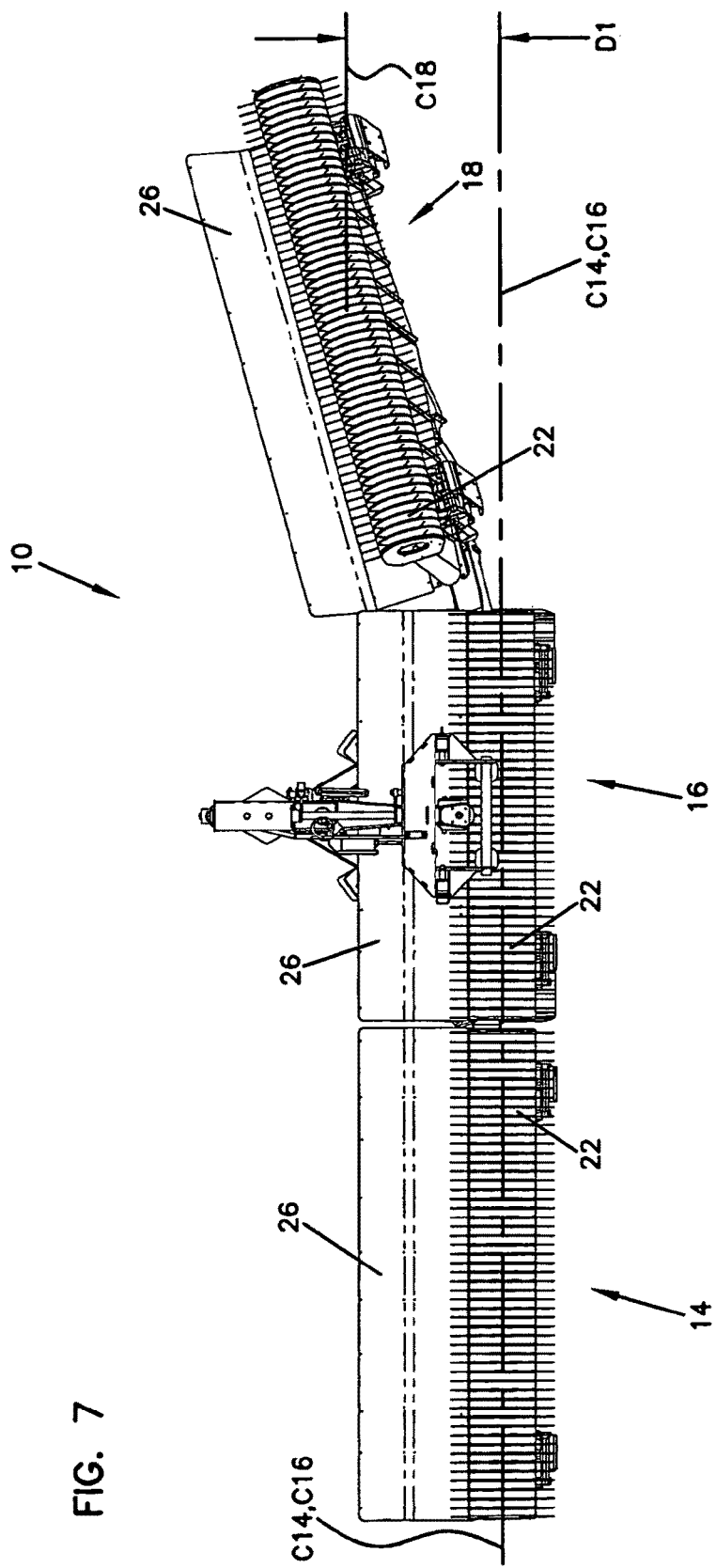
FIG. 7 is a front elevation view of the merger of FIG. 4, illustrated in another intermediate folding position.
Figure 8:
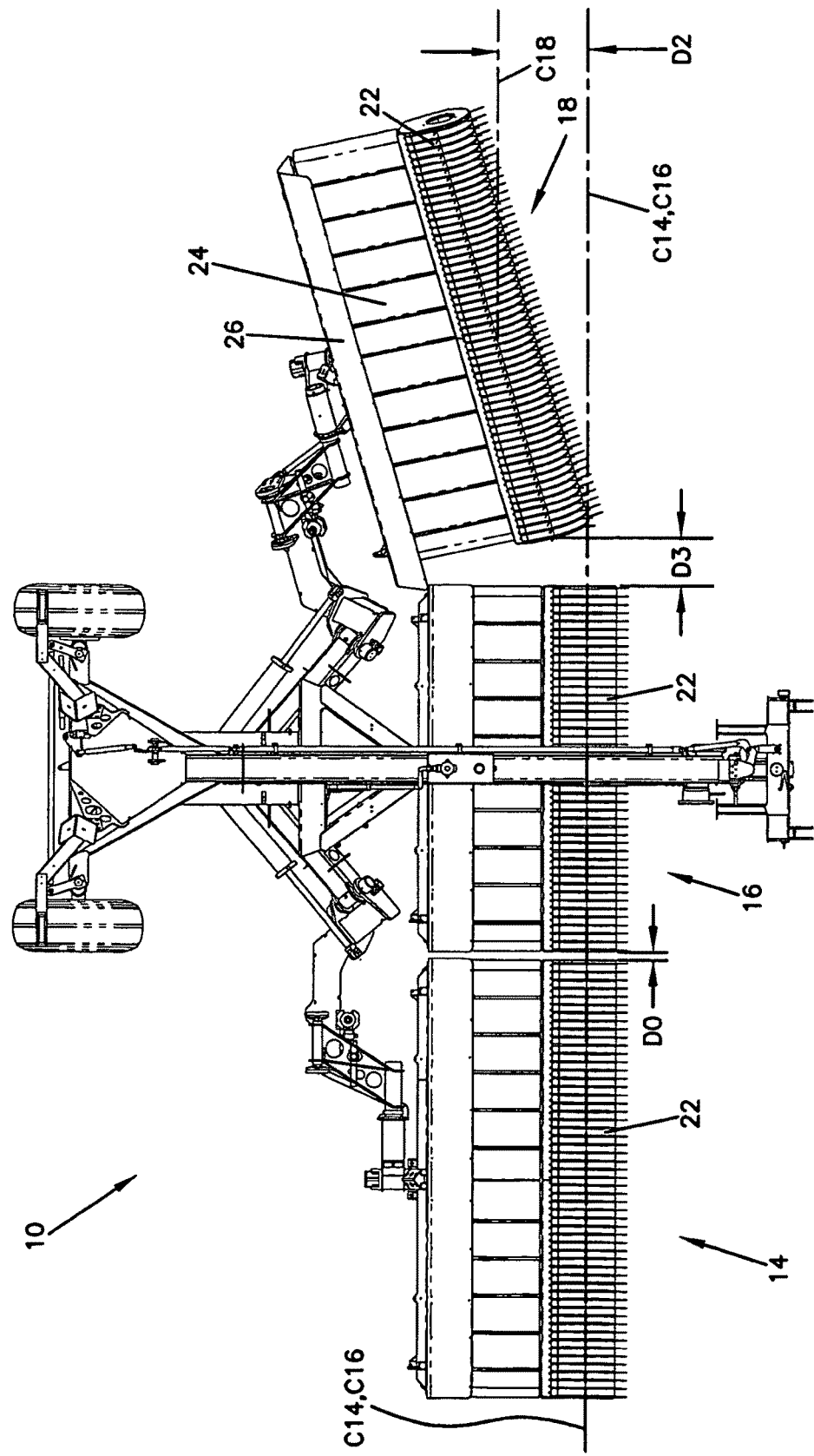
FIG. 8 is a top plan view of the merger of FIG. 7.
Figure 9:
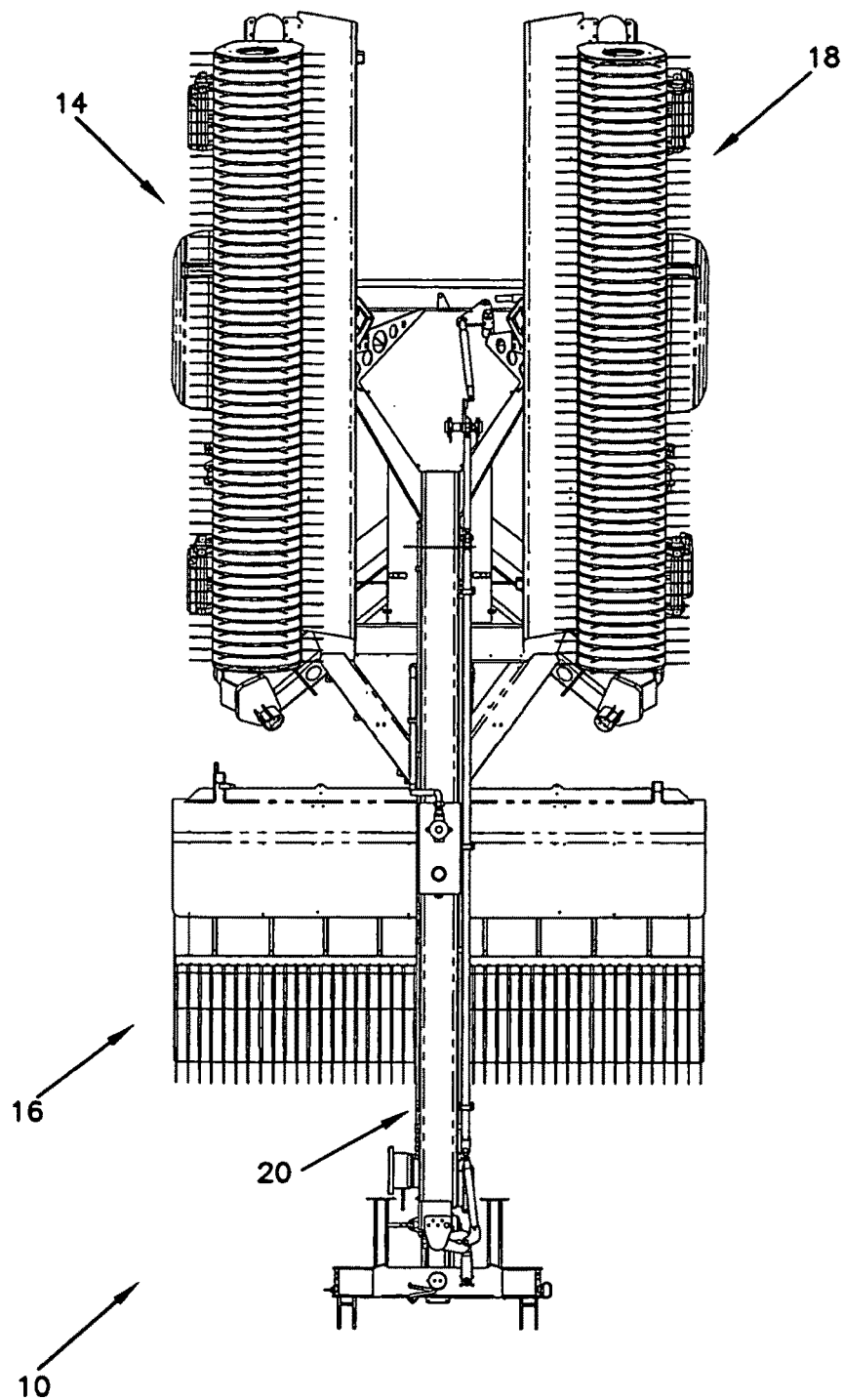
FIG. 9 is a top plan view of the merger of FIG. 2, illustrated in a completely folded position.

At the initiation of folding movement, the outer unit moves or folds simultaneously upward, outward and rearward. That is, the outer unit 18 moves or pivots upward relative to the unfolded, merging position, and at the same time moves or pivots outward and rearward relative to the unfolded, merging position. In FIG. 5, the second outer unit 18 (with reference to the center point position C18) is located a vertical distance D1 upward from the unfolded merging position (e.g., in relation to the center point positions C14, C16 of unfolded units 14, 16); at the same time, and referring to FIG. 6, the unit 18 is a distance D2 rearward of the unfolded merging position; also at the same time, the unit 18 is a distance D3 further outward of the unfolded merging position (see comparison of D0 between units 14, 16, and D3 between units 16, 18; FIG. 6). FIGS. 7 and 8 illustrate the unit 18 in a more intermediate stage of folding where the vertical distance D1 is further from the unfolded merging position, the distance D2 is further rearward from the unfolded merging position, and the distance D3 is further outward from the unfolded merging position.

Figure 11:
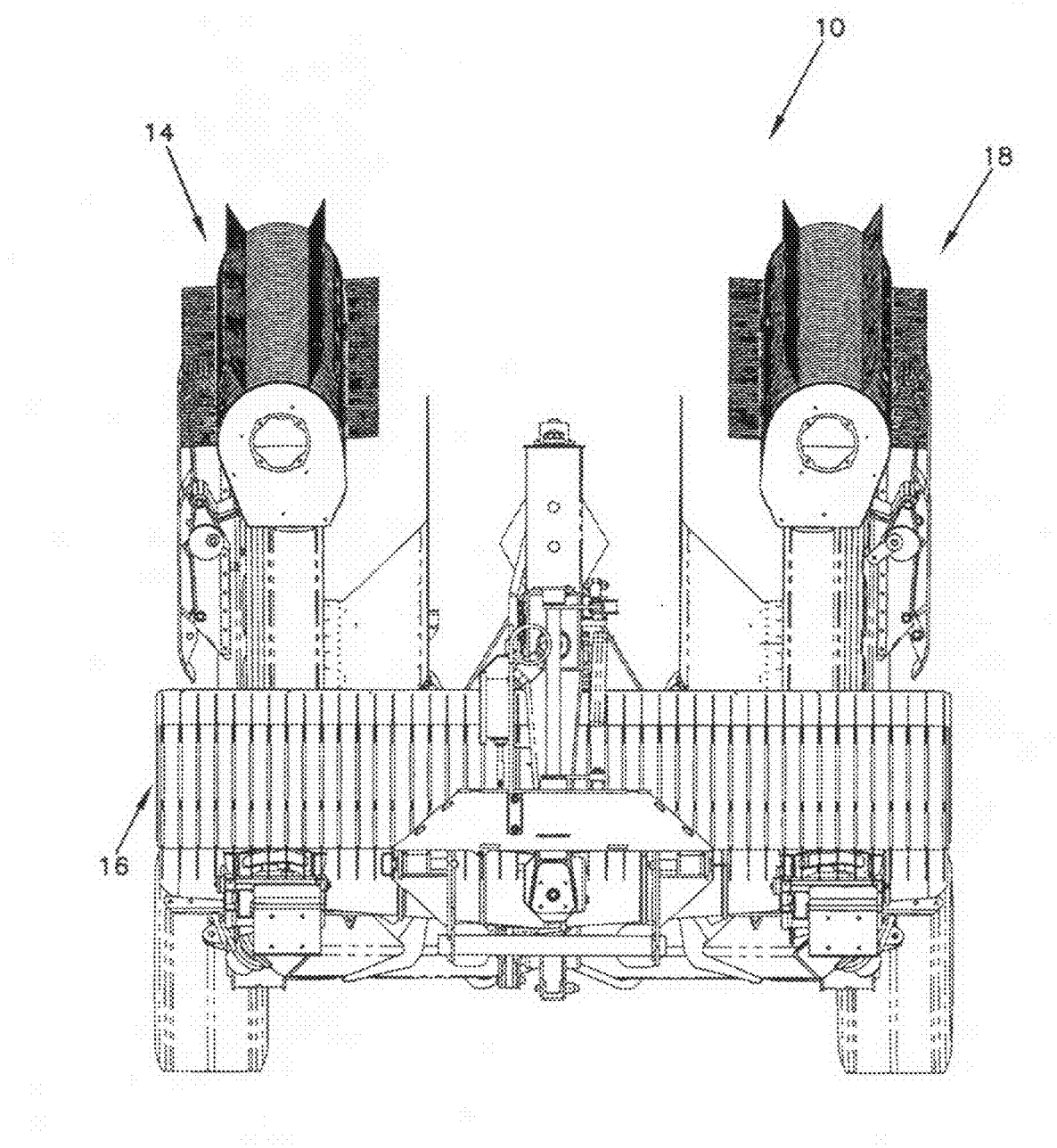
FIG. 11 is a front elevation view of the merger of FIG. 10.
Figure 12:
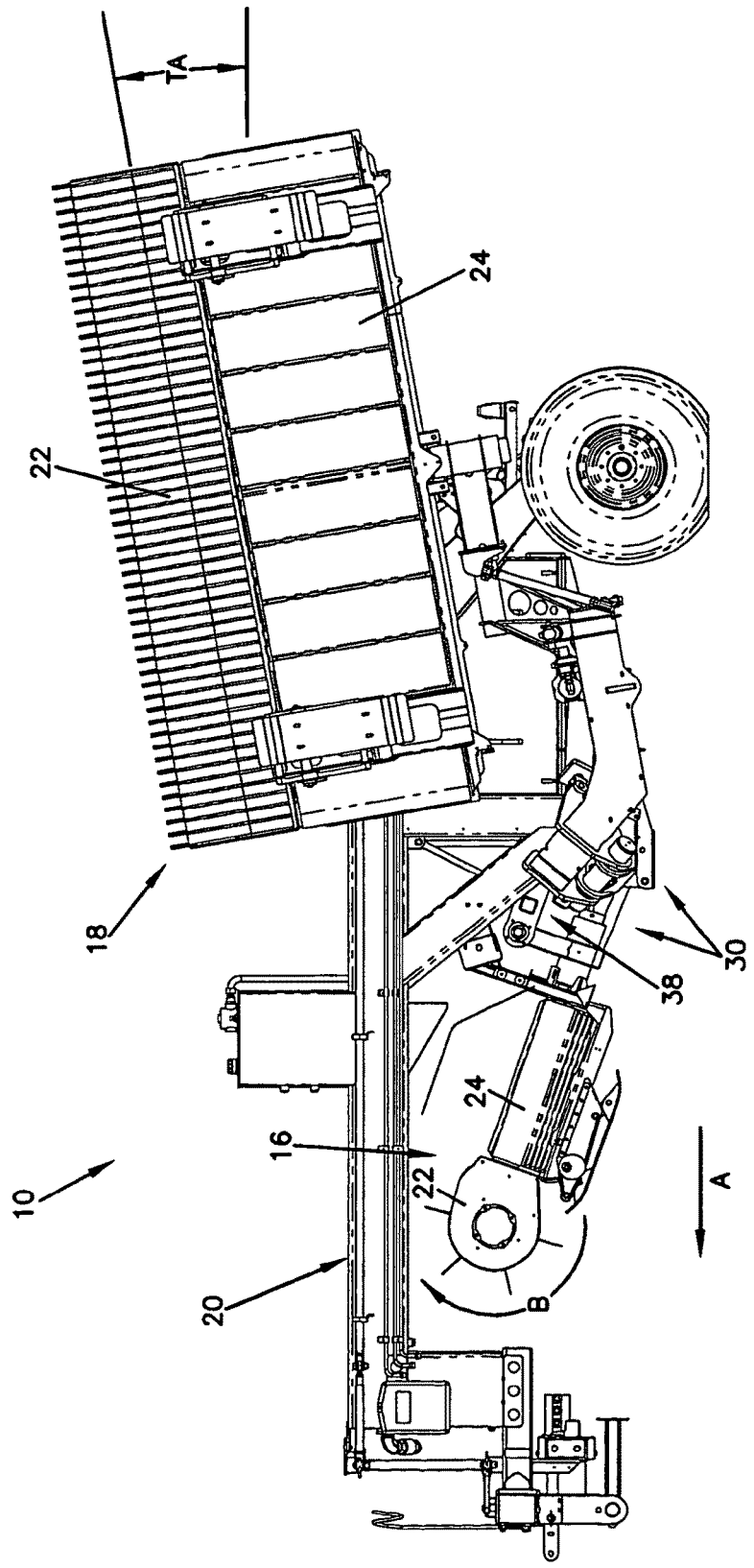
FIG. 12 is a side elevation view of the merger of FIG. 10.

As can be understood, with the upward, outward and rearward movement occurring simultaneously, the folding motion of the outer heads is generally arcuate. The arcuate folding is continued until the units reach the folded position shown in FIGS. 9-12. Referring to FIG. 12, in the folded position, the outer units 14, 18 are substantially horizontal to provide an overall merger height that is reasonable for transport. What is meant by "substantially horizontal" is that the outer units 14, 18 are positioned at a transport angle TA that is less than 45 degrees relative to horizontal. In one embodiment, the transport angle TA is less than about 25 degrees relative to horizontal.

As previously discussed, the leftward outer unit 14 folds in the same manner as the rightward outer unit 18. Referring to FIGS. 3 and 12, the center unit 16 also folds by moving forward and tilting upward. That is, the folding system 30 moves the center unit 16 toward the front of the frame 20, as represented by arrow A in FIG. 12, while at the same time tilting a front end of the center unit 16 upward, as represented by arrow B. Each of the pickup and transfer units 14, 16, 18 can commence folding simultaneously, or commence folding at different times. In one embodiment, a control system that controls the folding movement includes three switches that correspond to the three pickup and transfer unit 14, 16, 18, and a single master switch. The user may fold or unfold only a selected one of the units by activating the corresponding one of the three switches, or may commence simultaneously folding of all units by activating only the single master switch.

Figure 13:
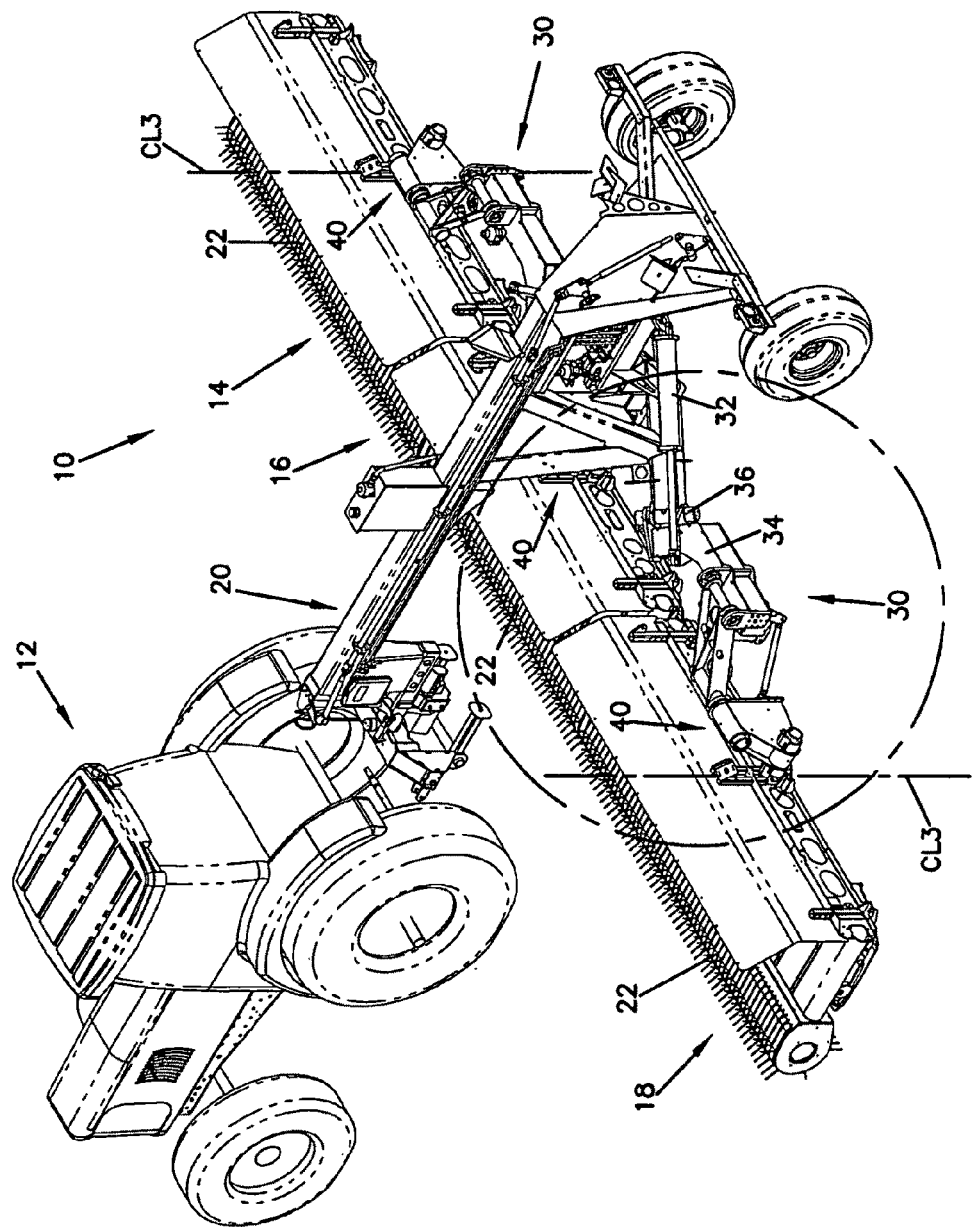
FIG. 13 is a rear perspective view of the vehicle towing the merger of FIG. 1.
Figure 14:
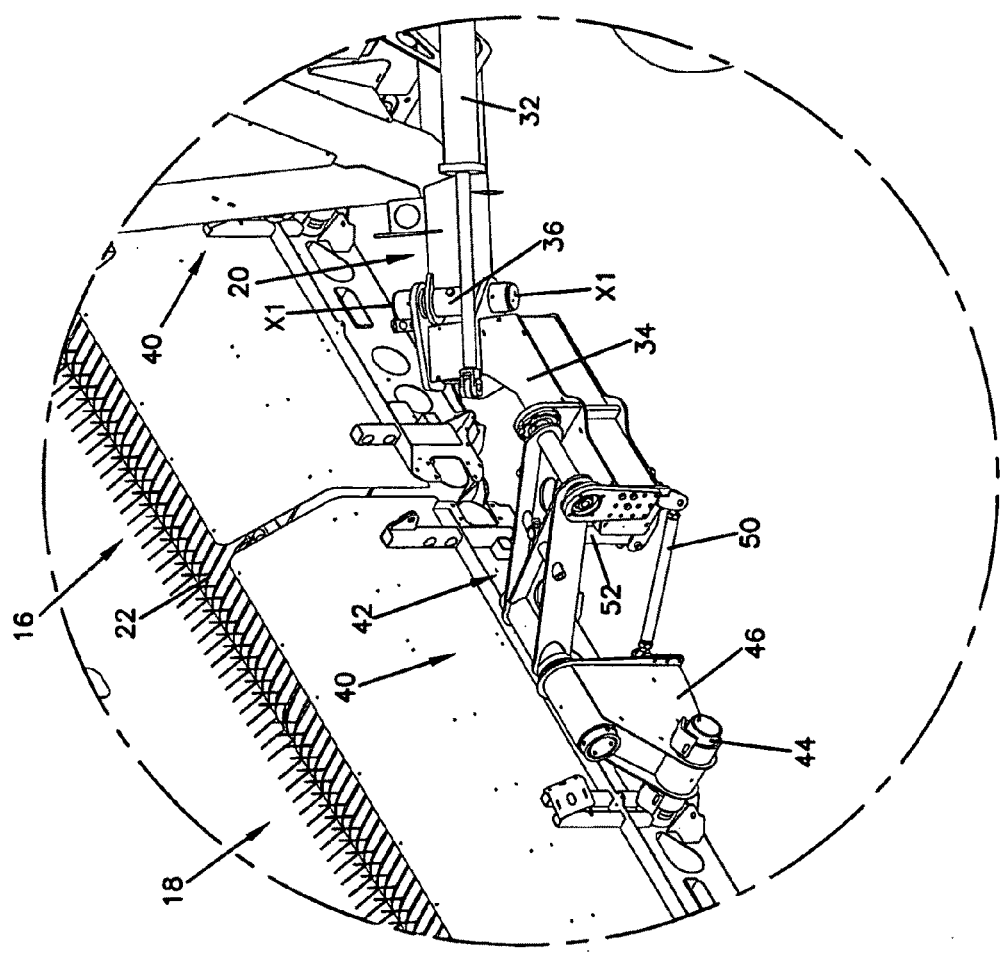
FIG. 14 is an enlarged detail view of a portion of the merger of FIG. 13, illustrating a portion of a folding system and a portion of a floating system of the present merger.

Referring now to FIGS. 13 and 14, the folding system 30 of the present merger 10 includes a lift cylinder 32 coupled to a lift arm 34. The lift arm 34 is in turn coupled to the frame 20 (FIG. 14) by a pivot pin 36. The rightward outer unit 18 is interconnected to the lift arm 34 by float mechanism 40, which will be described in greater detail hereinafter. As can be understood, the folding system 30 includes a second set of identical components (e.g., 32, 34, 36) at the other side of the merger 10, which interconnect to the leftward outer unit 14.

Referring to FIG. 14, the lift cylinder 32 is fully extended when the outer unit 18 is in the unfolded position. In this unfolded position, the lift arm 34 is generally horizontal. As will be described in greater detail hereinafter, the lift arm 34 pivots about an axis X1 of the pivot pin 36. Because the lift cylinder 32 cannot move beyond the fully extended position, the lift arm 34 does not move or rotate beyond the shown horizontal position. Instead, the outer unit 18 can only move upward and rearward in an arcuate manner from the unfolded position, as previously described. Accordingly, in the unfolded position, the outer units 14, 18 are as close to the center unit 16 as is possible during any phase of folding or unfolding.

The folding system 30 is designed to ensure interference between the units is avoided during folding or unfolding, whereby the outer units 14, 16 are closest in proximity to the center unit 16 in the unfolded position than in any other intermediate folding or unfolding position. This is achieved in part by the orientation of the pivot pin 36 and in part by the arrangement of the lift cylinder 32.

Figure 15:
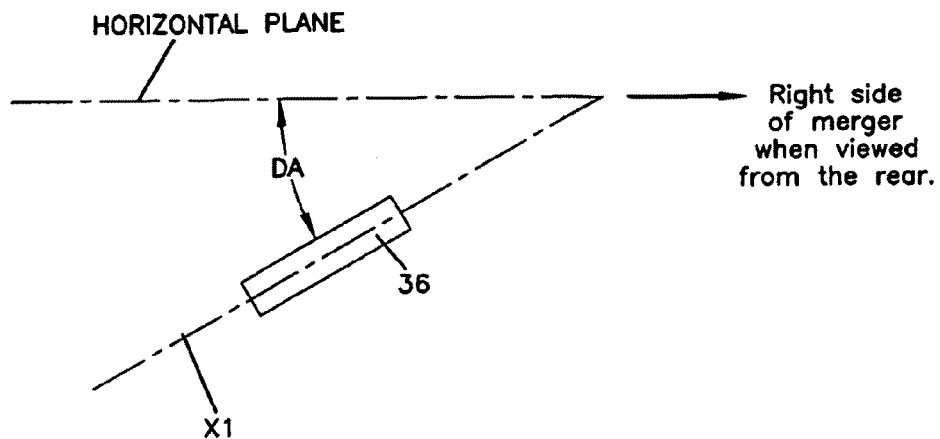
FIG. 15 is a schematic rear elevation view of a pivot pin of the folding system of FIG. 14.
Figure 16:
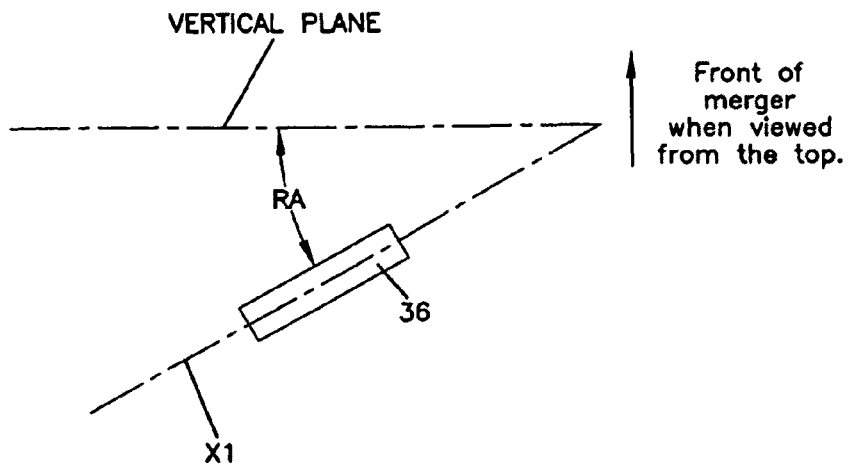
FIG. 16 is a schematic top plan view of the pivot pin of FIG. 15.

Referring again to FIG. 13, the pivot pin 36 of the folding system 30 is angled relative to horizontal and relative to vertical. In the illustrated embodiment and when viewed from the rear, the pivot pin 36 is downwardly angled at an angle DA (FIG. 15) from a horizontal plane. The angle DA is generally between 30 and 50 degrees (in one embodiment, the angle DA is approximately 40 degrees). When viewed from the top, the pivot pin 36 is also rearwardly angled at an angle RA (FIG. 16) from a longitudinal vertical plane ("longitudinal" relative to the longitudinal alignment of the merger heads 22). The angle RA is generally between 30 and 50 degrees (in one embodiment, the angle RA is approximately 40 degrees).

The downward and rearward orientation of the angled pivot pin 36 ensures interference is avoided by immediately moving the outer unit 18 away from the center unit 16 during folding operation (i.e., immediately moving the unit upward, outward and rearward from the center unit 16). In addition, when unfolding, the lowest extent of rotational travel of the lift arm 34 is limited to the horizontal position by the lift cylinder 32 (i.e., the fully extended position of the lift cylinder 32 limits rotation of the lift arm 34 beyond the horizontal position). Accordingly, the lowest extend of rotational travel of the outer unit 18 is at the unfolded position shown in FIG. 13. Collisions or interference between units during folding and unfolding is thereby avoided.

In addition to preventing collisions or interference between units during folding operation, the downward and rearward angled orientation of the pivot pins 36 also position the outer units in a convenient transport configuration. In particular, when folding the outer units 14, 18 for transport, the lift cylinders 32 retract and draw the lift arms 34, along with the units upwardly and rearwardly. Referring to FIGS. 11 and 12, the cylinders 32 continue to retract until the lengths of the merger heads 22 of the outer units are parallel with the lengthwise axis of the merger 10. When in the transport or folded position, the outer units are more horizontal than vertical, as previously described. In the transport position, the outer units 14, 18 are also centered behind the vehicle 12 for ease of towing, and are located within the outer boundaries of the center unit 16, which keeps the transport width of the merger reasonable.

Referring again to FIG. 12, the folding system 30 also includes a lift cylinder (not shown) for folding and unfolding the center unit 16. The center unit lift cylinder is coupled to a lift arm 38, which in turn, is coupled to the frame 20. The center unit lift cylinder of the folding system 30 extends to move the lift arm 38, and in turn the center unit 16 forward, while at the same time tilting the front end of the center unit 16 upward, as represented by arrow B. In this folded position, the center unit 16 is lifted up from the ground for transport or for clearance of difficult terrain during merging operations.

Referring back to FIGS. 13 and 14, the present merger 10 further includes three unique float mechanisms 40 that permits each pickup and transfer units 14, 16, 18 to conform to rolling terrain. Each of the float mechanisms 40 associated with the outer units 14, 18 generally includes a linkage 42 (FIG. 14) connected to the lift arm 34 of the merger, a pivot pin or tube 44 connected to the corresponding pickup and transfer unit, and an intermediate bracket connection 46 that interconnects the linkage 42 and the pivot tube 44. The float mechanism 40 associated with the center unit 16 has the same linkage 42, pivot tube 44, and intermediate bracket connection 46, only the linkage 42 is connected directly to the frame 20.

The pivot tube 44 of each float mechanism 40 is the primary attachment between the pickup and transfer units 14, 16, 18 and the frame 20. The pivot tube 44 attaches to the unit (e.g., 18) at a generally central attachment location between first and second ends of the merger head 22. Each of the first and second ends of the merger head 22 is a free end. What is meant by "free" end is that the ends are not constrained by structural supports or attachments; instead, the unit is free to pivot (e.g., tilt or rock side to side) about an axis X2 (FIG. 17) defined by the pivot tube 44. When the unit is in the unfolded merging position, the axis X2 of the pivot tube 44 is generally horizontal, and is generally parallel to a direction of travel of the merger 10.

Figure 17:
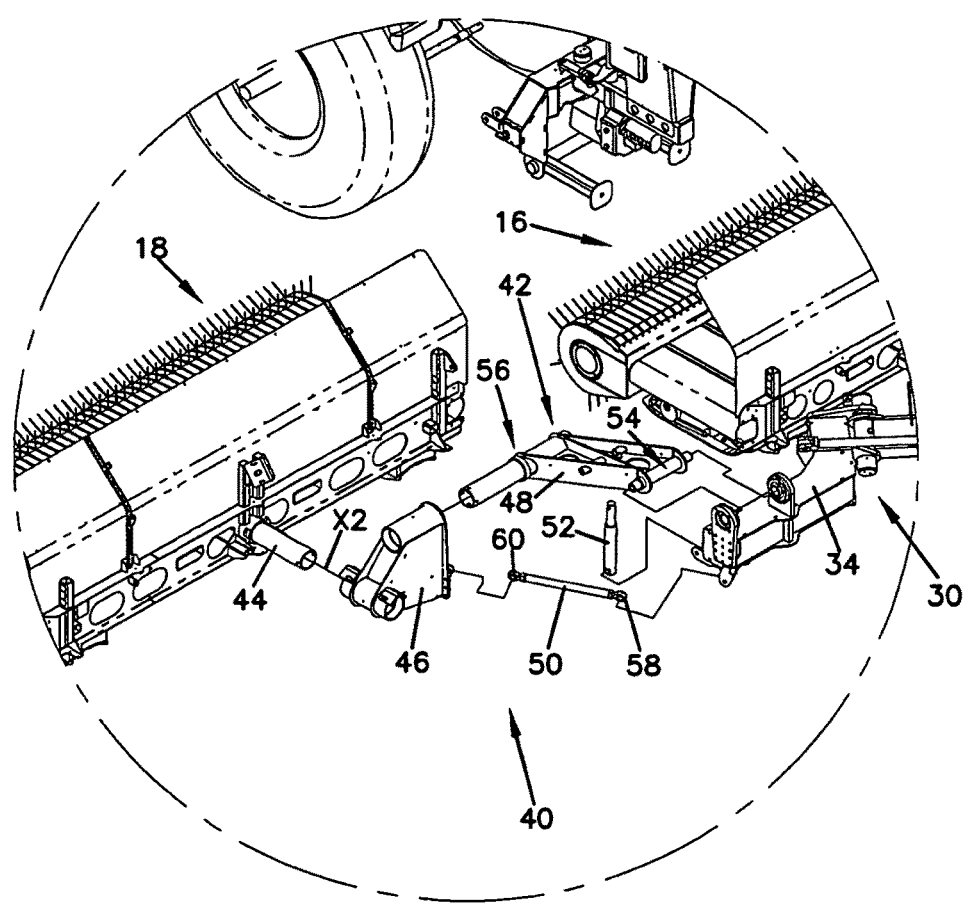
FIG. 17 is an exploded view of a float mechanism of the floating system of FIG. 14.

Referring now to FIG. 17, the linkage 42 of each float mechanism 40 includes a float arm 48, a float link 50, and a float cylinder 52. The float arm 48 has a first end 54 that is pivotally attached to the lift arm 34 of the folding system 30 and a second end 56 that is pivotally or rotationally attached to the intermediate bracket connection 46. The first and second ends 54, 56 of the float arm 48 pivot about axes X3, X4 (FIG. 18) that are generally horizontal, and transverse to the direction of travel of the merger, when the associated unit is in the unfolded merging position. The float link 50 similarly has a first end 58 attached to the lift arm 34 of the folding system 30 and a second end 60 attached to the intermediate bracket connection 46. The float cylinder 52 is mounted to the lift arm 34 and is coupled to the linkage 42.

In use, the float mechanism 40 defines a four-bar parallelogram construction that allows the pivot tube 44, and in turn the pickup and transfer unit, to travel only in a vertical direction while preventing travel in a lateral direction (i.e., a horizontal sideward direction). In particular, the linkage 42 and the float link 50 fix the lateral positioning of the intermediate bracket connection 46, the pivot tube 44, and the associated unit (e.g., 18). Yet, the pivotal connection between the linkage 42 and the lift arm 34, and the pivotal connection between the linkage 42 and the intermediate bracket connection 46, allow the unit to move along a fixed vertical plane defined by a vertical centerline CL3 (FIG. 13) to accommodate uneven terrain.

Figure 18:
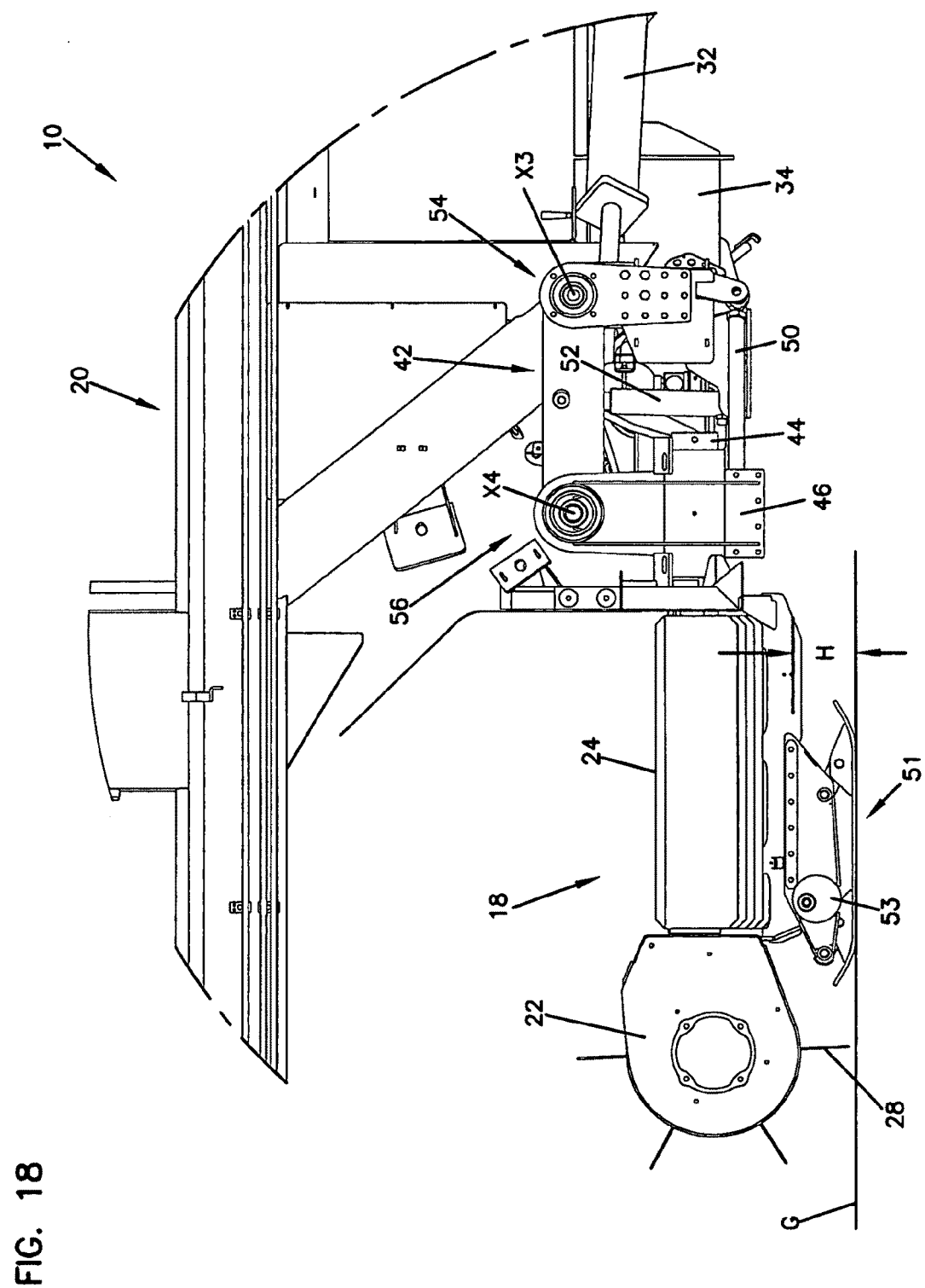
FIG. 18 is a side elevation view of a portion of the merger of FIG. 3, illustrating the floating system of the merger in a neutral position.
Figure 19:
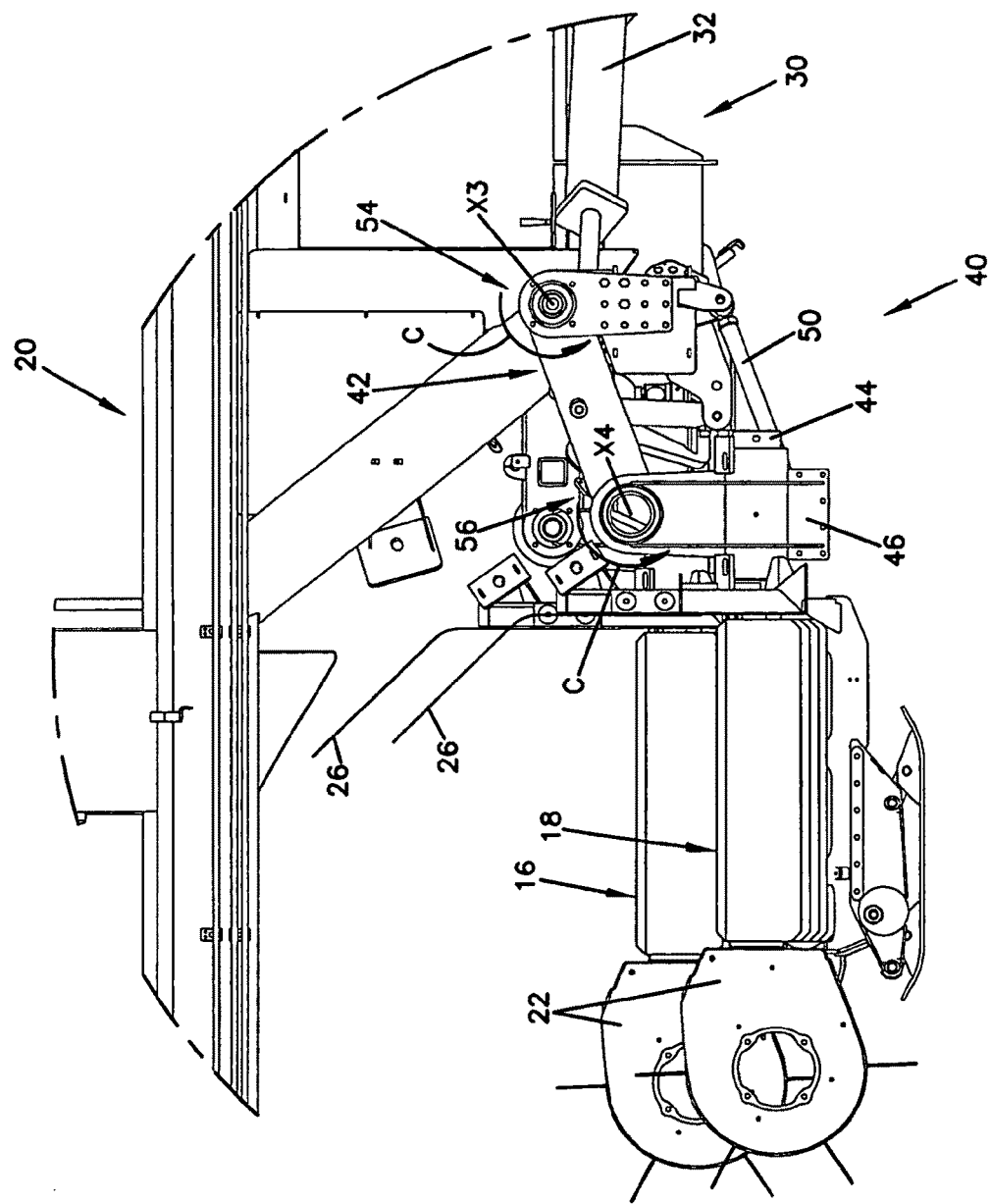
FIG. 19 is a side elevation view of the portion of the merger of FIG. 18 illustrating one float mechanism of the floating system in a lowered position.
Figure 20:
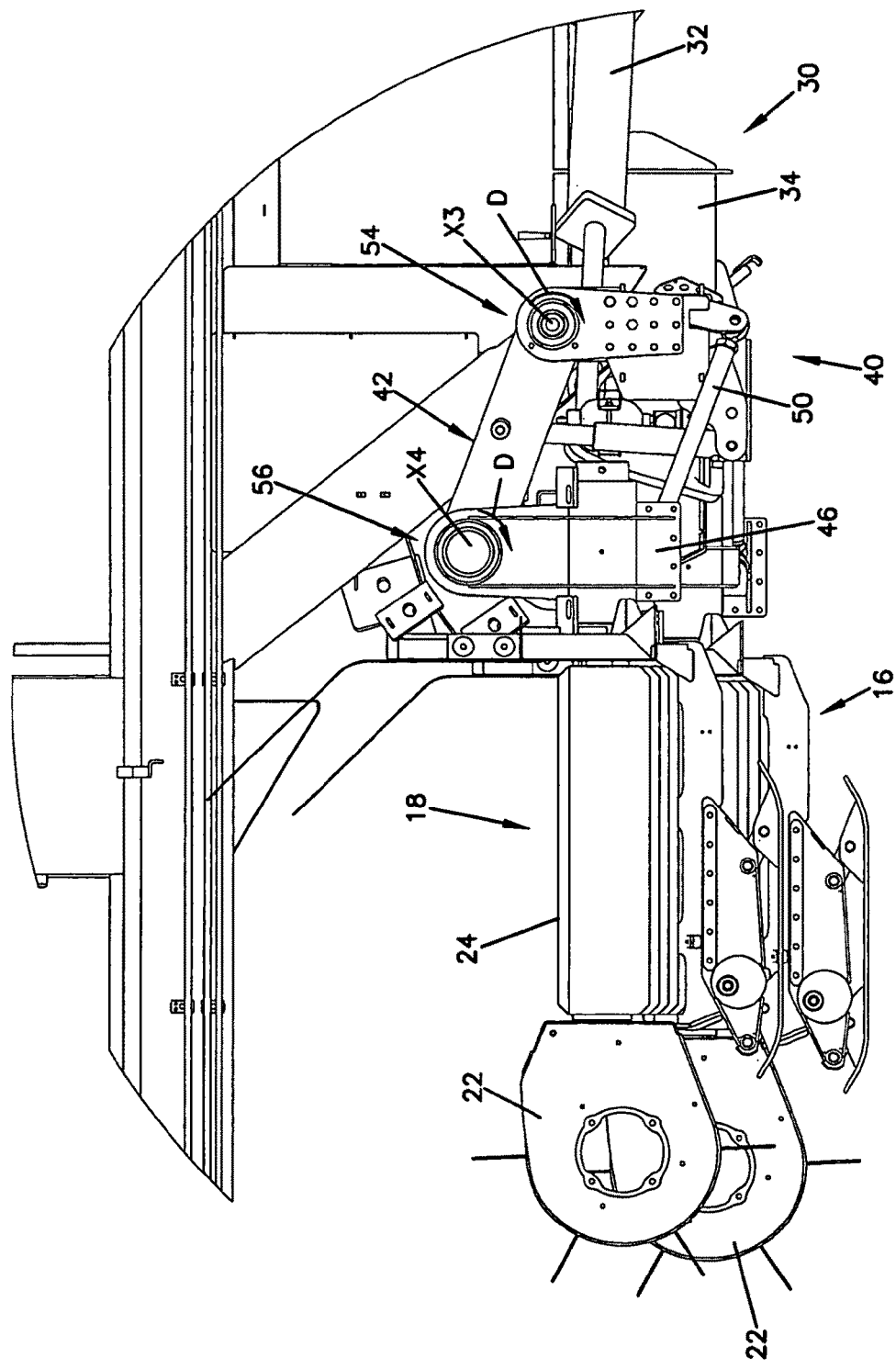
FIG. 20 is a side elevation view of the portion of the merger of FIG. 18 illustrating one float mechanism of the floating system in a raised position.

Referring now to FIGS. 18-20, the movement along the fixed vertical plane is illustrated. In FIG. 18, all of the units 14, 16, 18 are shown in a neutral position (only outer unit 18 can be seen from the side). In FIG. 19, the outer unit 18 is shown in a lower position as if following a depression in the terrain. In particular, the unit 18 has been lowered along the vertical plane, without transverse horizontal movement, by counter-clockwise rotation of the first and second ends 54, 56 of the linkage 42 about axes X3 and X4 (as shown by arrows C). In FIG. 20, the outer unit 18 is shown in an upper position as if following an incline in the terrain. In this position, the unit 18 has been raised along the vertical plane, without transverse horizontal movement, by clockwise rotation of the first and second ends 54, 56 of the linkage 42 about axes X3 and X4 (as shown by arrows D).

The float mechanisms 40 of the present merger 10 permit only the associated one pickup and transfer unit experiencing a change in terrain to move along the vertical plane to accommodate that change. As previously described, the pivot tube 44 of the float mechanisms 40 further permits only that associated one pickup and transfer unit to rock side to side to accommodate a change in terrain. The pickup and transfer units 14, 16, 18 thereby each independently move as described to conform to the rolling terrain during merger operations and to handle rough or changing terrain. Yet still, the lateral restraint imposed by the float mechanisms 40 prevents collisions between adjacent units when adjusting to uneven terrain.

Yet another feature of the present float mechanism 40 relates to the weight transfer of each individual pickup and transfer unit 14, 16, 18. Referring to back to FIG. 17, the float cylinder 52 of the float mechanism 40 is vertically oriented and coupled between the pickup and transfer unit and the frame (i.e. between the linkage 42 and the lift arm 34). When hydraulically pressurized, the float cylinder 52 applies a vertical lifting force to the linkage 42 and accordingly transfers a portion of the weight of the associated unit (e.g., 14, 16, 18) from the ground to the frame 20 of the merger 10. This allows the unit to ride more lightly on the ground so that the unit is more responsive to changes in contour.

In particular and referring to FIG. 18, each of the pickup and transfer units 14, 16, 18 includes a skid 51 mounted under the unit. When the units 14, 16, 18 are in the unfolded merging position, the skids 51 contact the ground G. The float mechanisms 40 provide the transfer of weight from the units to the frame 20 so that ground pressure is reduced to an acceptable level. The units 14, 16, 18 can thereby lift and lower as needed to maintain contact with the ground without operator interaction. Additionally, a cam adjustment, such as an eccentric cam 53, is provided to allow manual/hydraulic adjustment of the height H of the skid 51. Adjusting the height H of the skid 51 correspondingly adjusts that height of the associated merger head 22 and tines 28 relative to the ground G.

The present arrangement thereby provides for optimum pickup capability and minimal wear of the tines, for example. That is, the pickup and transfer units 14, 16, 18 maximizing contact time with the material that is to be picked up but yet accommodate sudden changes in contour and other irregularities of the terrain with greater ease. The responsiveness of the present arrangement decreases damage to the pickup and transfer units and accordingly decreases maintenance and down time of the merger.

Yet another feature of the present merger 10 is a device that produces a more uniform windrow, as opposed to a windrow that has large clumps or an uneven volume distribution. In harvesting or processing unevenly distributed windrows, the harvesting device (such as a baler or forage harvester) must slow or pause when large clumps are encountered, and further does not receive enough material input when lighter volume windrow portions are encountered. As can be understood, a uniform windrow aids in increasing the efficiencies of the harvesting device.

Figure 21:
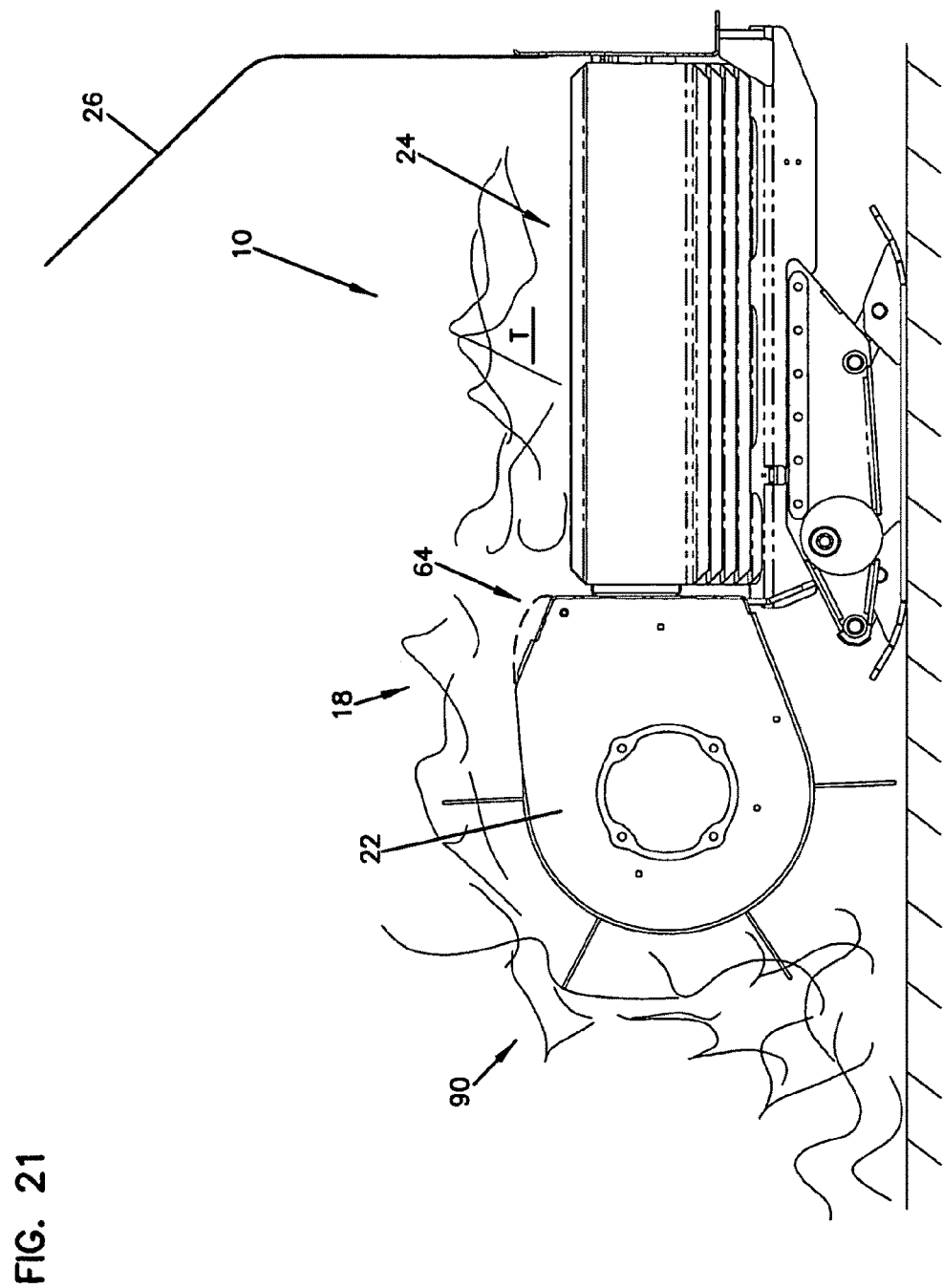
FIG. 21 is a side elevation view of a portion of the merger of FIG. 3, illustrating a rub rail.

Referring to FIG. 21, the merger heads 22, the shrouds 26, and the conveyors 24 of each unit 14, 16, 18 (only unit 18 is illustrated) generally define a trough T into which material 90 (schematically represented) flows during merger operations. Each unit 14, 16, 18 includes a rub rail 64 (see also FIG. 22) positioned adjacent to or within the trough T, and relative to the merger head 22. In the illustrated embodiment, the rub rail 64 mounts to a rearward wall 72 (FIG. 22) of the merger head 22.

Figure 22:
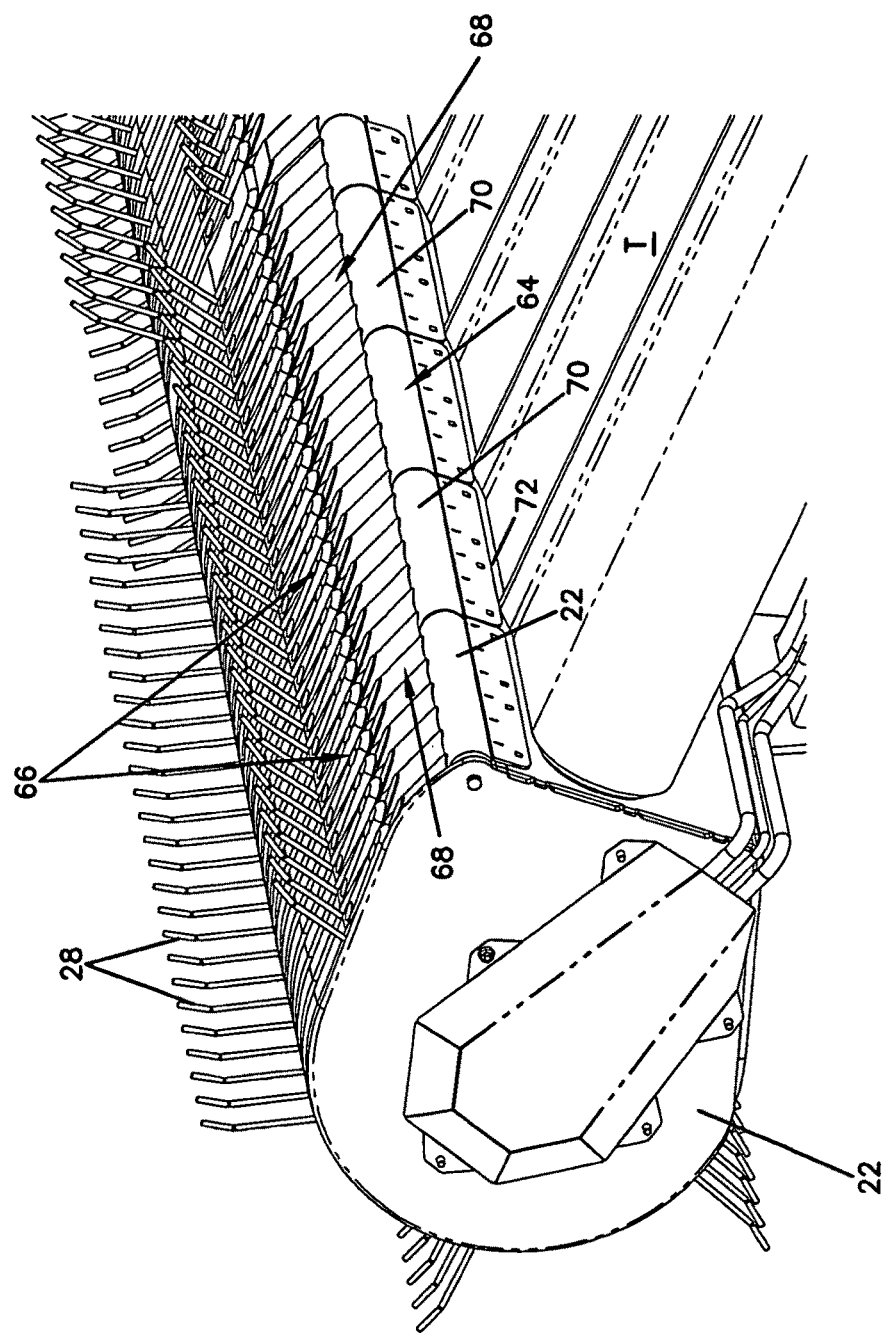
FIG. 22 is a rear perspective view of a portion of the merger of FIG. 21.

Referring to FIGS. 22 and 23, the merger head 22 generally defines slots 66 through which the tines 28 pass during rotation/operation of the merger head 22. A comb or combs 68 are located adjacent to the slots 66. The merger 10 can includes a single comb that extends the length of each merger head 22 (i.e., from one end to the other end); or can be made up of segments of combs 68 that extend from one end of the merger head to the other end, as illustrated in FIG. 23. In one embodiment, the combs 68 are in segments having a length of approximately twelve inches. Other segment lengths can be used in accordance with the principles disclosed. During operation, the combs 68 remove material from the tines 28 as the tines 28 pass through the slots 66. The rub rail 64 of the present disclosure is incorporated into the construction of the combs 68.

Figure 25:
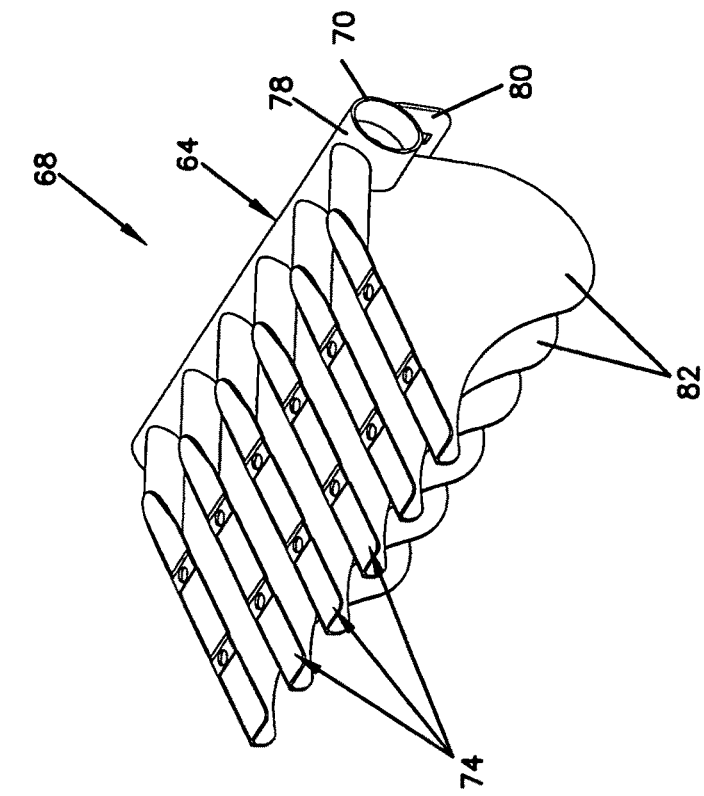
FIG. 25 is a front perspective view of the comb segment of FIG. 24.
Figure 24:
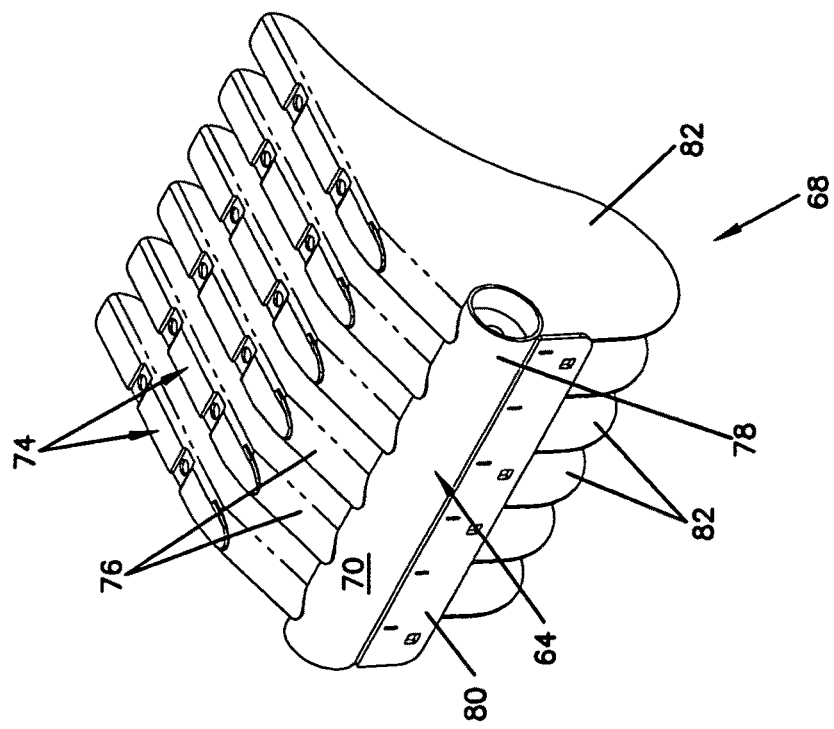
FIG. 24 is a rear perspective view of a comb segment of FIG. 23, shown in isolation.

Referring now to FIGS. 24 and 25, one segment of a comb 68 is illustrated in isolation. The comb 68 includes a mounting bracket 80 and a plurality of comb components 74 (e.g., dividers, guides, teeth, material-removal constructions, etc.). The comb 68 is secured to the rearward wall 72 (FIG. 22) by the mounting bracket 80. In one embodiment, each comb component 74 includes a smaller tubular construction 76 that is joined, such as by welding, to a larger tubular construction 78. A shield or guide 82 depends downward from the smaller tubular construction 76. The smaller tubular constructions 76 are spaced from one another to at least in part define the slots 66 through which the tines 28 pass.

The larger tubular construction 78 of the combs 68, at least in part defines the rub rail 64 of each unit (e.g., 18). In the illustrated embodiment, the rub rail 64 has a curved or rounded construction that faces inward toward the trough T. The rounded construction is defined by a smooth surface 70 (FIG. 22). The rounded, smooth surface 70 aids in transitioning material from the merger head into the trough T.

As material 90 is conveyed through the trough T toward the end of the merger 10, the material encounters the smooth surface 70 of the rub rail 64, as opposed to the material encountering projections and/or the slots 66, for example. As a result, less swirling or clumping occurs, and a more uniform windrow is produced. The smooth surface 70 of the rub rail 64 further reduces swirling, catching or clumping to aid in containing the material within the trough T until conveyed to the end of the merger. What is meant by "smooth" is that the surface is generally free of obstructing structure (e.g., projections, recesses, etc.) that would otherwise cause conveying material to catch and swirl. As can be understood, the present rub rail arrangement can be used on other mergers in accordance with the principles disclosed, including mergers having a greater or lesser number of merger heads than the present merger 10.

Figure 27:
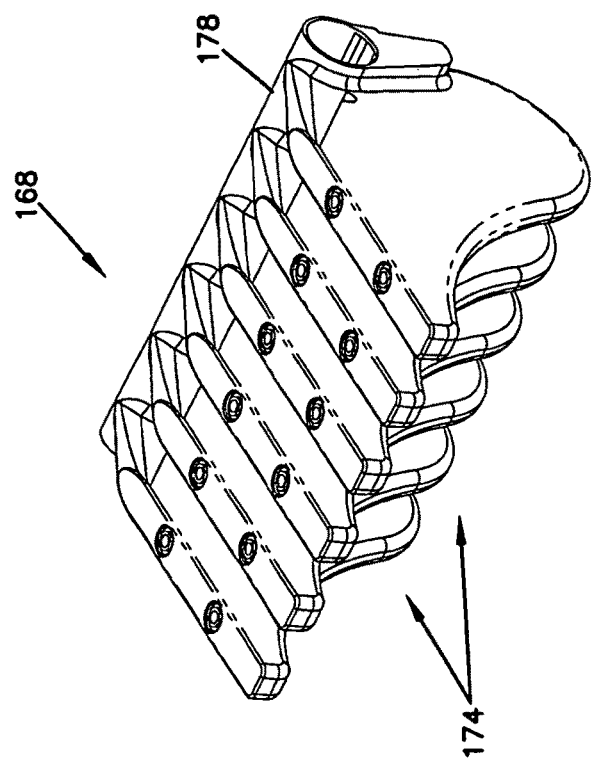
FIG. 27 is a front perspective view of the comb segment of FIG. 26.
Figure 26:
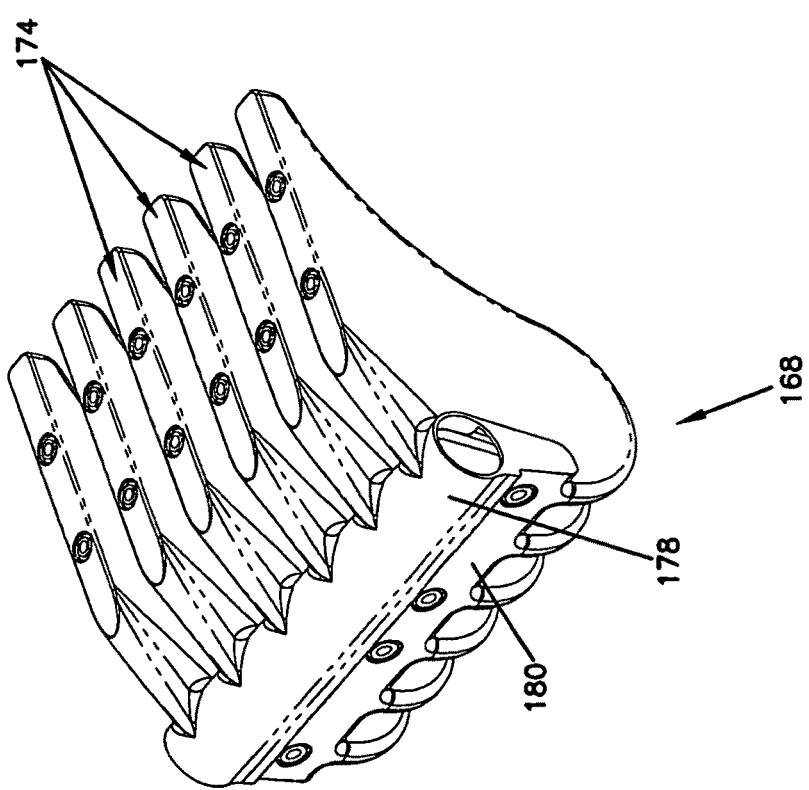
FIG. 26 is a rear perspective view of another embodiment of a comb segment, in accordance with the principles disclosed.
Figure 28:
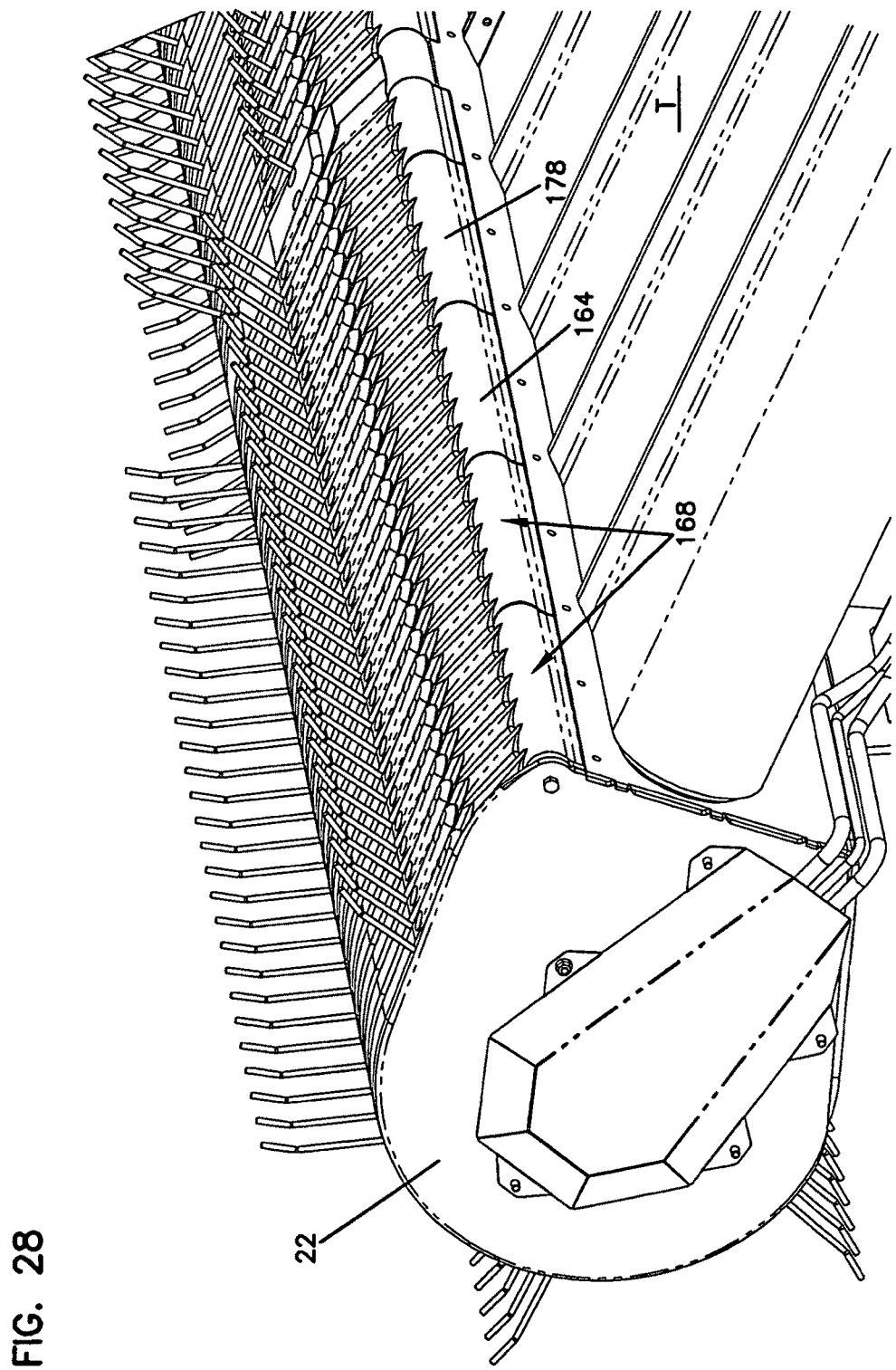
FIG. 28 is a rear perspective view of a portion of the merger of FIG. 21 incorporating instead the comb segment embodiment of FIG. 26.

Referring now to FIGS. 26 and 27, an alternative embodiment of a segment of a comb 168 is illustrated. In this embodiment, the comb 168 is made of molded plastic. Similar to the previous comb 68, the molded comb 168 includes a mounting bracket or mounting surface 180 and a plurality of comb components 174 (e.g., dividers, guides, teeth, material-removal constructions, etc.). Each of the mounting bracket/surface 180 and the comb components 174 are integrally joined or molded with one another. Each comb component 174 of the comb 168 is integrally joined or molded to a larger tubular construction 178. Referring to FIG. 28, the larger tubular construction 178 of the comb segments 168, at least in part defines a rub rail 164 that reduces swirling or clumping, as previously described.

While in each of the disclosed embodiments of FIGS. 22 and 28, the rub rail 64, 164 is incorporated into the construction of the comb 68, 168. It is contemplated, however, that a rub rail separate from the comb or comb segments can also be used. For example, a rub rail having a smooth surface that extends along the trough can be mounted relative to the comb segments to cover any projections, recesses, etc. and reduce swirling or clumping, in accordance with the principles disclosed.

The above specification provides a complete description of the present invention. Since many embodiments of the invention can be made without departing from the spirit and scope of the invention, certain aspects of the invention reside in the claims hereinafter appended.

What is claimed is:

1. A windrow merger configured for moving along a forward direction of travel, comprising:
   a) a pickup and transfer unit defining a trough in which material is conveyed, the unit including a merger head and a belt conveyor, the merger head including a plurality of tines that rotate during operation; a comb at least partially defining slots through which the tines pass during rotation; and
   b) a rub rail mounted on the pickup and transfer unit intermediate the comb and the belt conveyor and within the trough, the rub rail having a tube portion including an upper surface forming a continuous unobstructed rounded surface arcing rearward and downward toward the belt conveyor.

2. The merger of claim 1, wherein the rub rail and comb are defined by a plurality of segments, the plurality of segments arranged side by side and extending continuously from one end of the merger head to an opposite end of the merger head.

3. The merger of claim 2, wherein each of the plurality of segments comprises a comb section extending forward from a rub rail section including a tube section, the comb sections forming the comb and the rub rail sections forming the rub rail.

4. The merger of claim 1, further including a plurality of pickup and transfer units, each pickup and transfer unit including a rub rail, the plurality of pickup and transfer units defining the trough in which material is conveyed.

5. The merger of claim 4, wherein the plurality of pickup and transfer units includes three pickup and transfer units, the merger further including a folding system that simultaneously moves each of the three pickup and transfer units from an unfolded position to a folded position wherein one of the three units moves forward and the other two units move rearward.

6. The merger of claim 1, wherein the rub rail has a continuous surface extending along the merger head.

7. The merger of claim 3, wherein each comb section extends from the rub rail section toward the merger head.

8. The merger of claim 1, wherein the tube portion comprises an enclosed tube portion proximate the trough.

9. The merger of claim 2, each of the plurality of segments including a forward comb section and a rub rail section proximate the trough and incorporating a tube element, the comb section extending forward from an upper portion of the tube element, the comb sections forming the comb and the rub rail sections forming the rub rail.

10. The merger of claim 2, each of the plurality of segments comprising a monolithic element.

11. The merger of claim 3, each of the plurality of segments comprising a monolithic element.

* * * * *